United States Patent
Kang et al.

(10) Patent No.: US 11,924,572 B2
(45) Date of Patent: Mar. 5, 2024

(54) IMAGE SENSOR, IMAGE DEVICE HAVING THE SAME, AND OPERATING METHOD THEREOF

(71) Applicant: Samsung Electronics Co., Ltd., Suwon-si (KR)

(72) Inventors: Sunyool Kang, Suwon-si (KR); Kyungtae Kim, Suwon-si (KR); Yunhwan Jung, Hwaseong-si (KR); Yongjun Cho, Hwaseong-si (KR); Heesung Chae, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 371 days.

(21) Appl. No.: 17/198,355

(22) Filed: Mar. 11, 2021

(65) Prior Publication Data

US 2022/0038651 A1   Feb. 3, 2022

(30) Foreign Application Priority Data

Jul. 31, 2020   (KR) ........................ 10-2020-0096174

(51) Int. Cl.
*H04N 25/778* (2023.01)
*H04N 25/709* (2023.01)
*H04N 25/75* (2023.01)

(52) U.S. Cl.
CPC ......... *H04N 25/778* (2023.01); *H04N 25/709* (2023.01); *H04N 25/75* (2023.01)

(58) Field of Classification Search
CPC .. H04N 25/441; H04N 25/616; H04N 25/709; H04N 25/75; H04N 25/778; H04N 25/78
See application file for complete search history.

(56) References Cited

U.S. PATENT DOCUMENTS

| 7,728,894 | B2 | 6/2010 | Chou |
| 10,021,335 | B2 | 7/2018 | Niwa et al. |
| 2014/0124651 | A1* | 5/2014 | Nakahara ............ H04N 25/617 327/307 |
| 2017/0064233 | A1 | 3/2017 | Matsumoto |
| 2018/0278874 | A1* | 9/2018 | Inada ...................... H03M 1/08 |
| 2018/0352200 | A1 | 12/2018 | Matsumoto |

FOREIGN PATENT DOCUMENTS

| JP | H0818872 A | 1/1996 |
| JP | 2004-121856 A | 4/2004 |
| JP | 2019-146016 A | 8/2019 |

* cited by examiner

*Primary Examiner* — Daniel M Pasiewicz
(74) *Attorney, Agent, or Firm* — Harness, Dickey & Pierce, P.L.C.

(57) ABSTRACT

An image sensor includes a first amplifier comparing and amplifying a first voltage signal received from a first column line, and a ramp signal; a second amplifier amplifying an output of the first amplifier; a third amplifier comparing and amplifying a second voltage signal received from a second column line, and the ramp signal; and a fourth amplifier amplifying an output of the third amplifier, wherein the second amplifier and the fourth amplifier output a decision signal at different points in time by dummy switch control split.

7 Claims, 24 Drawing Sheets

IMAGE SENSOR, IMAGE DEVICE HAVING THE SAME, AND OPERATING METHOD THEREOF

CROSS-REFERENCE TO RELATED APPLICATION(S)

This application claims benefit of priority to Korean Patent Application No. 10-2020-0096174 filed on Jul. 31, 2020 in the Korean Intellectual Property Office, the disclosure of which is incorporated herein by reference in its entirety.

BACKGROUND

The present inventive concepts relate to an image sensor, an image device having the same, and an operating method thereof.

In general, an image sensor captures a two-dimensional or three-dimensional image of an object. The image sensor uses a photoelectric conversion element responding according to intensity of light reflected from the object, to generate an image of the object. With the recent development of complementary metal-oxide semiconductor (CMOS) technology, CMOS image sensors using a CMOS may be widely used. In CMOS image sensors, correlated double sampling (CDS) technology may be used to remove reset noise of a pixel. In order to improve image quality, relatively high performance is required of an analog-to-digital conversion circuit using CDS technology.

SUMMARY

An aspect of the present inventive concepts is to provide an image sensor distributing a decision output of correlated double sampling, an image device having the same, and an operating method thereof.

According to an aspect of the present inventive concepts, an image sensor includes a first amplifier comparing and amplifying a first voltage signal received from a first column line, and a ramp signal; a second amplifier amplifying an output of the first amplifier; a third amplifier comparing and amplifying a second voltage signal received from a second column line, and the ramp signal; and a fourth amplifier amplifying an output of the third amplifier, wherein the second amplifier and the fourth amplifier output a decision signal at different points in time by dummy switch control split.

According to an aspect of the present inventive concepts, an image sensor includes a pixel array having a plurality of pixels arranged in a plurality of row lines and a plurality of column lines; a row driver selecting one of the plurality of row lines; an analog-to-digital converter converting analog signals output from the pixel array into digital signals; and a timing controller controlling timing of the pixel array, the row driver, and the analog-to-digital converter, wherein the analog-to-digital converter comprises: a comparison circuit having comparators comparing pixel signals output from the pixel array and a ramp signal; and a counter circuit having counters counting outputs of each of the comparators, wherein each of the comparators comprises: a first amplifier comparing and amplifying a pixel signal received from a corresponding column line among the plurality of column lines and the ramp signal; and a second amplifier amplifying an output of the first amplifier to output a decision signal, wherein the comparators output decision signals at different points in time according to a column line group of the plurality of column lines.

According to an aspect of the present inventive concepts, a method of operating an image sensor includes performing an auto zero operation for a first amplifier and a second amplifier; performing a count operation in response to a ramp signal, after the auto zero operation; and performing dummy switch control split of the second amplifier according to a column line group to change a decision point.

According to an aspect of the present inventive concepts, an image device includes an image sensor sensing an image signal from a plurality of pixels; an image signal processor receiving and processing image data output from the image sensor; and a display device outputting the image data processed by the image signal processor, wherein the image sensor comprises an analog-to-digital converter performing dummy switch control split according to a column line group to distribute a decision output.

BRIEF DESCRIPTION OF DRAWINGS

The above and other aspects, features, and advantages of the present inventive concepts will be more clearly understood from the following detailed description, taken in conjunction with the accompanying drawings, in which:

FIG. 6A is a view illustrating a pixel configured to have a 2×2 Bayer pattern, FIG. 6B is a view illustrating a pixel configured to have a 4×4 tetra pattern, FIG. 6C is a view illustrating a pixel configured to have an 8×8 Q-cell pattern, and FIG. 6D is a view illustrating a pixel having an infrared light (IR) sub-pixel.

DETAILED DESCRIPTION

Hereinafter, example embodiments of the present inventive concepts will be described with reference to the accompanying drawings.

In the following, the contents of the present inventive concepts will be described clearly and in detail to the extent that those of ordinary skill in the art may easily implement them using the drawings.

Figure 1:
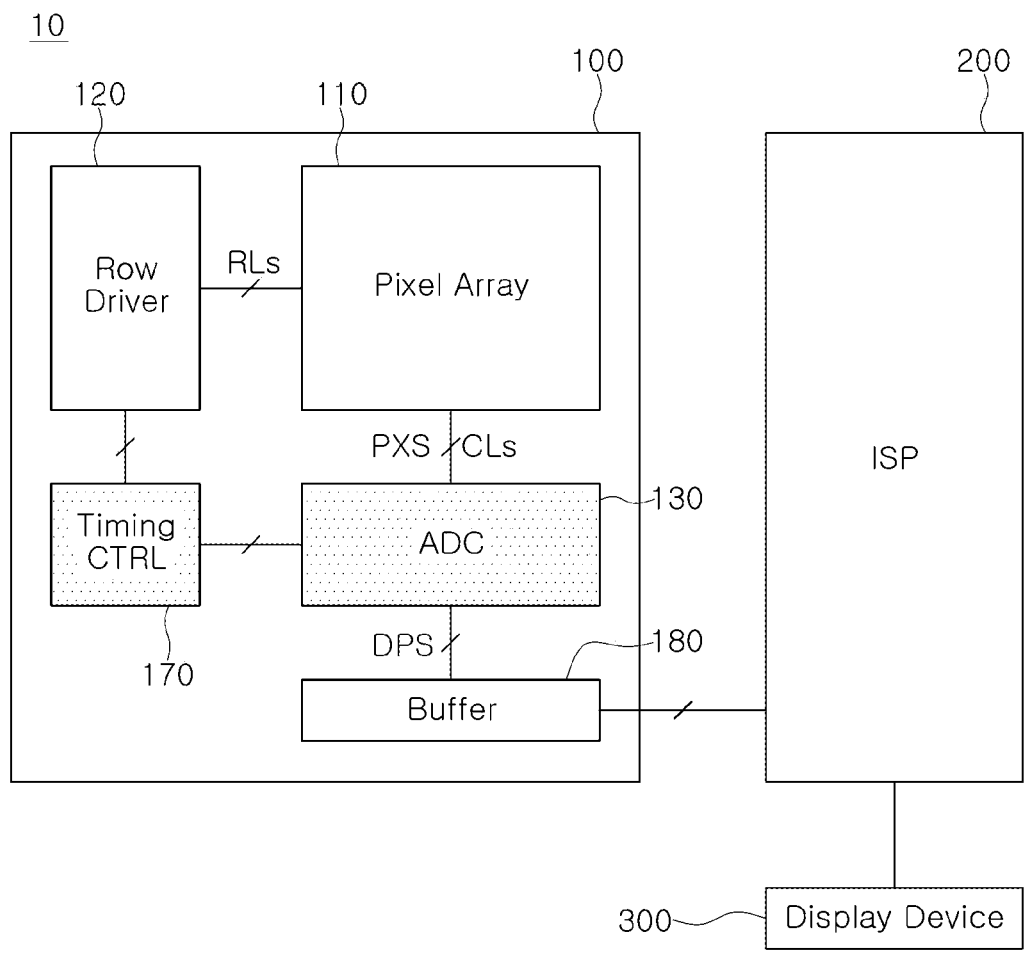
FIG. 1 is a view illustrating an image device 10 according to example embodiments of the present inventive concepts.

FIG. 1 is a view illustrating an image device 10 according to example embodiments of the present inventive concepts. Referring to FIG. 1, an image device 10 may include an image sensor 100, an image signal processor (ISP) 200, and/or a display device 300.

The image device 10 may be an electronic device such as a camera, a smartphone, a wearable device, an internet-of-things (IoT) device, a tablet personal computer (PC), a personal digital assistant (PDA), a portable multimedia player (PMP), a navigation device, or the like. In addition, the image device 10 may be an electronic device provided as a component in vehicles, furniture, manufacturing facilities, doors, and various measuring devices.

The image sensor 100 may sense an image of an object captured by a lens 500 under control of the image signal processor 200, and the image signal processor 200 may be implemented to process the image sensed by the image sensor 100 and output the processed image to the display device 300. The display device 300 may be implemented to output an image. For example, the display device 300 may include a computer, a mobile phone, and other image output terminals.

The image signal processor 200 may receive image data, which may be an output signal of a buffer 180, to process an image to be appropriate for a viewer, and may output the processed image to the display device 300. The image signal processor 200 may be disposed external to the image sensor 100, as illustrated in FIG. 1. The present inventive concepts need not be limited thereto. An image signal processor of the present inventive concepts may be disposed inside an image sensor.

The image sensor 100 may include a pixel array 110, a row driver 120, an analog-to-digital converter (ADC) 130, and/or a buffer 180.

The pixel array 110 may include a plurality of photo-sensing elements disposed at an intersection of a plurality of row lines RLs and a plurality of column lines CLs. Each of the plurality of photo-sensing elements may include a photo-sensing element such as a photo diode, a pinned photo diode, or the like. The pixel array 110 may sense light using the plurality of photo-sensing elements, and may convert the sensed light into an electrical signal to generate an image signal.

The row driver 120 may be implemented to drive the pixel array 110 in a row unit. For example, the row driver 120 may generate a row select signal. Further, the pixel array 110 may output a pixel signal PXS from a row selected by the row select signal provided from the row driver 120. The pixel signal PXS may include a reset signal and an image signal.

The ADC 130 may be implemented to convert an analog pixel signal, input from the pixel array 110, into a digital pixel signal. The ADC 130 may include a comparison circuit (e.g., correlated double sampling (CDS)) and a counter circuit (e.g., a data bus (DBS)). According to example embodiments, a readout circuit outputting a pixel signal from the pixel array 110 and inputting the pixel signal to the ADC 130 may be further provided between the pixel array 110 and the ADC 130.

Further, the ADC 130 may be implemented to distribute decision points in time according to column line groups. In some example embodiments, the decision points in time may be points in time at which comparison results are output to a counter. For example, the ADC 130 may make a decision point in time in an even-numbered column line group to be different from a decision point in time in an odd-numbered column line group. For example, a decision rate may be changed by switch control split corresponding to the column line groups, to perform a distribution operation at the decision point in time.

A timing controller 170 may be implemented to output a signal or a clock signal to the row driver 120, the ADC 130, and/or the buffer 180, to control the row driver 120, the ADC 130, and/or the buffer 180.

In addition, the timing controller 170 may generate switching control signals to vary the decision rate of the ADC 130 according to the column line group.

The buffer 180 may be implemented to temporarily store the digital pixel signal DPS output from the ADC 130 and then amplify and output the stored digital pixel signal DPS. In some example embodiments, the buffer 180 may include a plurality of column memory blocks (e.g., SRAM) included in each row for temporary storage, and a sense amplifier sensing and amplifying the digital pixel signal output from the ADC 130.

A conventional image sensor may process decision signals simultaneously for a relatively short period of time to cause IR drop. In this case, the IR drop refers that a constant voltage may not be supplied to all cells due to power line resistance and power consumption of the cells, and a reduced voltage may be supplied differently for each cell. An image sensor 100 according to example embodiments of the present inventive concepts may split a decision moment of the ADC 130 to reduce or prevent such IR drop.

An image device 10 according to example embodiments of the present inventive concepts may include an image sensor 100 reducing occurrence of IR drop, to improve overall performance in the process of acquiring and processing an image.

Figure 2:
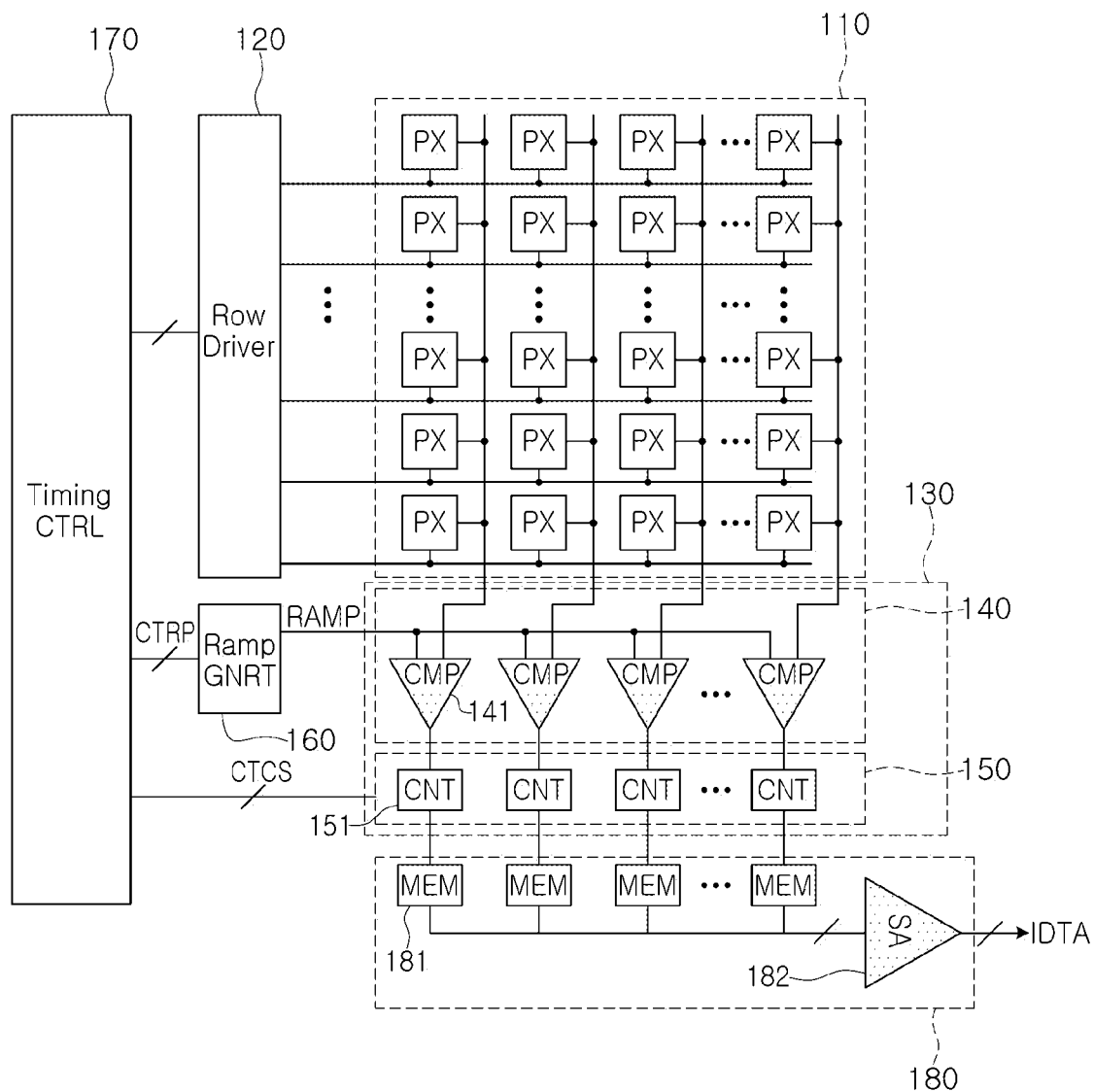
FIG. 2 is a view illustrating an image sensor 100 according to example embodiments of the present inventive concepts.

FIG. 2 is a view illustrating an image sensor 100 according to example embodiments of the present inventive concepts. Referring to FIG. 2, an image sensor 100 may include a pixel array 110, a row driver 120, an analog-to-digital converter 130, a ramp signal generator 160, a timing controller 170, and/or a buffer 180.

The pixel array 110 may include a plurality of pixels arranged in a matrix form, each of which may be connected to a plurality of row lines and a plurality of column lines CL. Each of the plurality of pixels may include a photo-sensing element. For example, the photo-sensing element may include a photodiode, a phototransistor, a photo gate, a pinned photodiode, or the like. Each of the plurality of pixels may include at least one photo-sensing element. In some example embodiments, each of the plurality of pixels may include a plurality of photo-sensing elements. The plurality of photo-sensing elements may be stacked on each other.

Each of the plurality of pixels may use a photo-sensing element to sense light, and may convert the sensed light into a pixel signal that may be an electrical signal. Each of the plurality of pixels may sense light in a specific spectral region. For example, the plurality of pixels may include a red pixel converting light in a red spectral region into an electrical signal, a green pixel converting light in a green spectral region into an electrical signal, and a blue pixel converting light in a blue spectral region into an electrical signal. A color filter transmitting light in a specific spectral region may be disposed on each of the plurality of pixels.

The row driver 120 may be implemented to drive the pixel array 110 in a row unit. The row driver 120 may decode a row control signal (e.g., an address signal) generated by the timing controller 170, and may select at least one row line among row lines constituting the pixel array 110 in response to the decoded row control signal. For example, the row driver 120 may generate a row select signal. Further, the pixel array 110 may output a pixel signal from a row selected by the row select signal provided from the row driver 120. The pixel signal may include a reset signal and an image signal.

The ADC 130 may be implemented to convert an analog pixel signal, input from the pixel array 110, into a digital pixel signal. The ADC 130 may include a comparison circuit 140 (CDB) and a counter circuit 150 (DBS).

The comparison circuit 140 may be implemented to compare a pixel signal, output from a unit pixel connected to any one column line among column lines CL constituting the pixel array 110, with a ramp signal (RAMP). The comparison circuit 140 may include a plurality of comparators 141 corresponding to each column. Each of the comparators 141 may be connected to the pixel array 110 and the ramp signal generator 160.

The comparator 141 (CMP) may be implemented to receive a pixel signal and a ramp signal (RAMP) generated from the ramp signal generator 160, compare the signals with each other, and output a comparison result signal to an output terminal.

The comparator 141 may generate a comparison result signal to which a correlated double sampling (CDS) technique is applied. Pixel signals output from a plurality of pixels may have deviations due to pixel-specific characteristics (e.g., fixed pattern noise (FPN), or the like) of each pixel, and/or deviations due to differences in characteristics of a logic for outputting a pixel signal from the pixel PX. The correlated double sampling technique may be a method calculating a reset component (or a reset signal) and an image component (or an image signal) for each of the pixel signals to compensate for the deviation between these pixel signals, and extracting a difference therebetween as a valid signal component. The comparator 141 may output a comparison result signal to which the correlated double sampling technique is applied.

The comparator 141 may be implemented as a two-stage amplifier. For example, the comparator 141 may include a first amplifier comparing a pixel signal and a ramp signal, and a second amplifier amplifying and outputting an output of the first amplifier. In some example embodiments, the first amplifier may operate based on an amount of a bias current in an auto zero step, smaller than an amount of a bias current in a comparison operation step. Therefore, while noise is reduced, an input range may be increased. In some example embodiments, the second amplifier may adaptively control current sources generating a bias current for each operation step, and may generate a minimum bias current before and after decision. Therefore, power fluctuation due to the operation of the second amplifier may be reduced or prevented. In some example embodiments, the first amplifier may include a limiting circuit connecting an output terminal and a common node. In some example embodiments, the limiting circuit may reduce or prevent a voltage level of the common node from falling on or below a minimum value at which the first amplifier may normally operate, and may compensate for voltage fluctuation occurring at an output node.

Further, the comparison circuit 140 may be implemented to output a decision signal (e.g., an output signal of a comparator) at different points in time according to a column line group.

The counter circuit 150 may include a plurality of counters 151. Each of the plurality of counters 151 (CNT) may be implemented to be connected to output terminals of the comparators 141 and count based on the output of each of the comparators 141. A counter control signal CTCS may include a counter clock signal, a counter reset signal controlling a reset operation of the plurality of counters 151, and an inverting signal for inverting each internal bits of the plurality of counters 151. The counter circuit 150 may count the comparison result signal according to the counter clock signal, and may output the counted comparison result signal as a digital pixel signal.

The counter 151 (CNT) may include an up/down counter, a bit-wise counter, or the like. In some example embodiments, the bit-wise counter may perform an operation, similar to the up/down counter. For example, the bit-wise counter may perform a function of performing only an up count, and a function of inverting all bits inside the counter, when a specific signal is input, to make 1's complement. The bit-wise counter may perform a reset count, and may then invert the reset count to convert the inverted reset count into 1's complement, e.g., a negative value.

The ramp signal generator 160 may be implemented to generate a ramp signal. The ramp signal generator 160 may operate based on a ramp control signal CTRP provided from the timing controller 170. The ramp control signal CTRP may include a ramp enable signal, a mode signal, and the like. When the ramp enable signal is activated, the ramp signal generator 160 may generate a ramp signal RAMP having a slope set based on the mode signal.

The timing controller 170 may be implemented to output a control signal or a clock signal to the row driver 120, the ADC 130, and the ramp signal generator 160, respectively, to control an operation or timing of the row driver 120, the ADC 130, and the ramp signal generator 160.

In addition, the timing controller 170 may generate switching control signals provided to the comparison circuit 140 to make a decision rate different according to a column line group.

The buffer 180 may be implemented to temporarily store, amplify, and output a digital pixel signal output from the ADC 130. The buffer 180 may include a column memory block 181 (MEM) and/or a sense amplifier 182 (SA).

The column memory block 181 (MEM) may include a plurality of memories. Each of the plurality of memories 183 may temporarily store a digital pixel signal output from each of the plurality of counters 151, and may then output the stored digital pixel signal to the sense amplifier 182.

The sense amplifiers 182 (SA) may be implemented to sense and amplify digital pixel signals output from the plurality of memories. The sense amplifier 182 may output the amplified digital pixel signals as image data IDTA.

An image sensor 100 according to example embodiments of the present inventive concepts may distribute a CDS output according to a column line group, to improve a margin of a low voltage (LVCC) in an ADC structure.

Figure 3A:
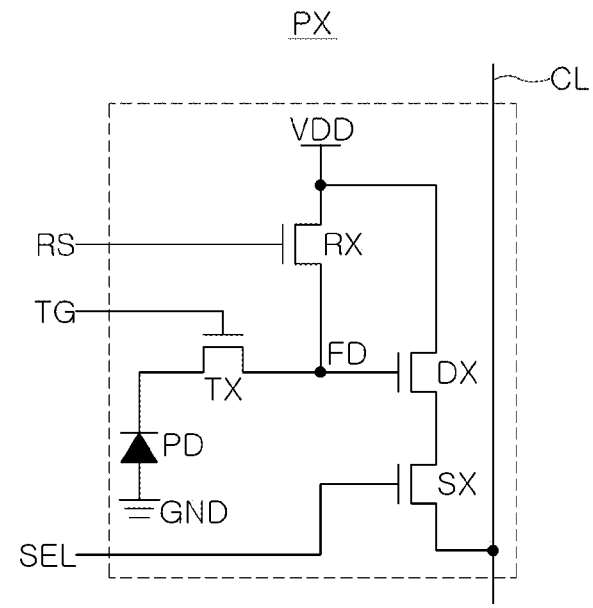
FIG. 3A is a view illustrating a pixel PX according to example embodiments of the present inventive concepts.

FIG. 3A is a view illustrating a pixel PX according to example embodiments of the present inventive concepts. Referring to FIG. 3A, a pixel PX may include a photodiode PD, a transfer transistor TX, a floating diffusion node FD, a reset transistor RX, a drive transistor DX, and/or a select transistor SX. In some example embodiments, the photodiode PD may be an example of a photoelectric conversion element, and may include at least one of a photo transistor, a photo gate, a pinned photo diode (PPD), and a combination thereof. The photodiode PD may be implemented to generate photocharges varying according to intensity of incident light.

The transfer transistor TX may transmit the photocharges to the floating diffusion node FD, according to a transmission control signal TG output from a row driver 120 (FIG. 2). According to a potential due to the photocharges accumulated in the floating diffusion node FD, the drive transistor DX may amplify the photocharges and may transmit the amplified photocharges to the select transistor SX. A drain of the select transistor SX may be connected to a source of the drive transistor DX, and a pixel signal PXS may be output to a column line CL connected to the pixel PX, according to a select signal SEL output from the row driver 120. The reset transistor RX may reset the floating diffusion node FD to a level of a power voltage VDD, according to a reset control signal RS provided from the row driver 120.

FIG. 3A illustrates a pixel having a 4-transistor (4T) structure including one (1) photodiode PD and four (4) MOS transistors TX, RX, DX, and SX. The pixel structure of the present inventive concepts is not limited thereto.

Figure 3B:
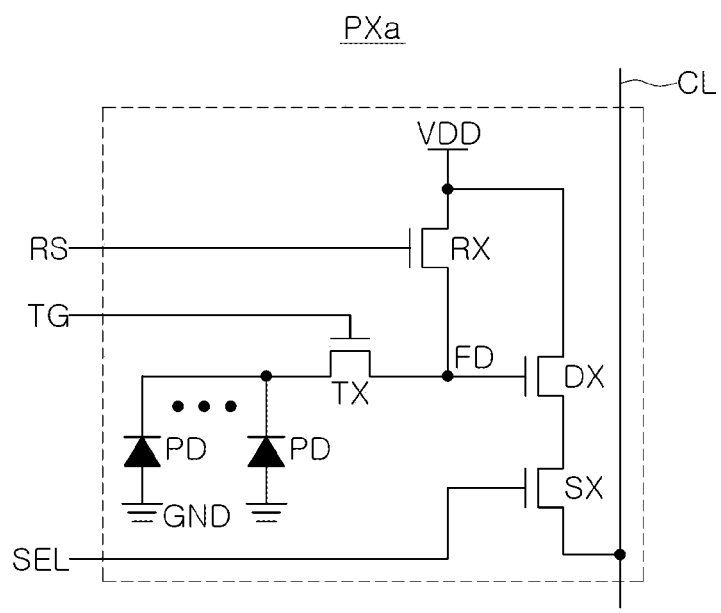
FIG. 3B is a view illustrating a pixel PXa according to other example embodiments of the present inventive concepts.

FIG. 3B is a view illustrating a pixel PXa according to other example embodiments of the present inventive concepts. Referring to FIG. 3B, a pixel PXa may be configured that a plurality of photodiodes are connected between a transfer transistor TX and ground terminals GND, as compared to the pixel PX of FIG. 3A.

A pixel according to example embodiments of the present inventive concepts may be implemented to adjust a conversion gain according to an operation mode.

Figure 4:
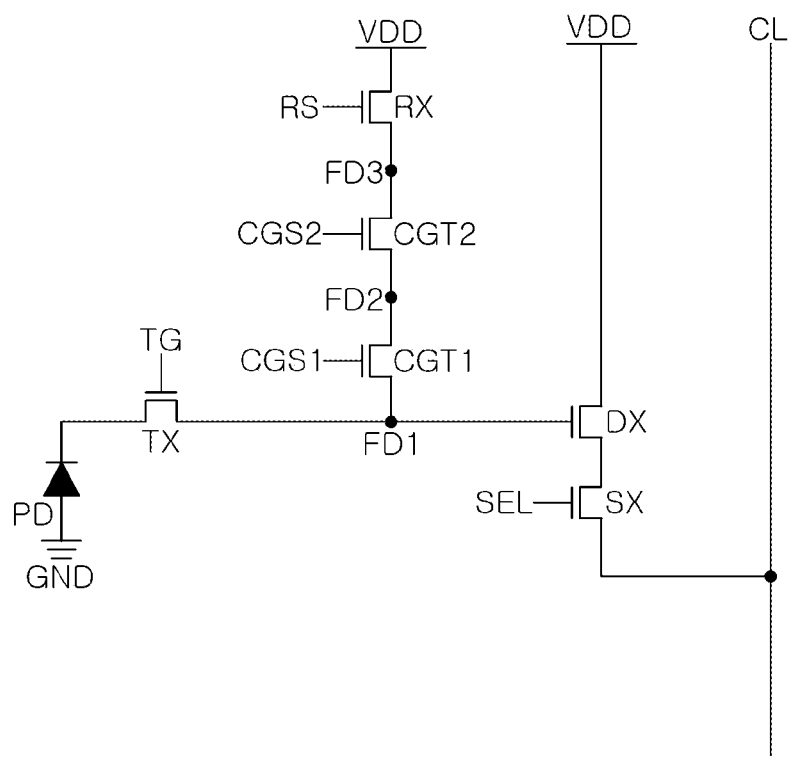
FIG. 4 is a view illustrating a pixel PXb according to example embodiments of the present inventive concepts.

FIG. 4 is a view illustrating a pixel PXb according to other example embodiments of the present inventive concepts. Referring to FIG. 4, a pixel PXb may include a transfer transistor TX, a drive transistor DX, a select transistor SX, a reset transistor RX, and/or conversion gain transistors CGT1 and CGT2.

The transfer transistor TX may connect a photodiode PD and a first floating diffusion node FD1 in response to a transfer gate signal TG. The drive transistor DX may provide a power voltage VDD to a drain of the select transistor SX in response to a voltage of the first floating diffusion node FD1. The select transistor SX may connect a drain of the drive transistor DX and an output terminal OUT in response to a select signal SEL. The reset transistor RX may connect a power terminal providing the power voltage VDD to a third floating diffusion node FD3 in response to a reset control signal RS. A first conversion gain transistor CGT1 may connect the first floating diffusion node FD1 and a second floating diffusion node FD2 in response to a first conversion gain signal CGS1. A second conversion gain transistor CGT2 may connect the second floating diffusion node FD2 and the third floating diffusion node FD3 in response to the second conversion gain signal CGS2.

A pixel PXb according to example embodiments of the present inventive concepts may optimize a conversion gain by controlling the conversion gain signals CGS1 and CGS2 according to an operation mode to vary a size of a floating diffusion region.

In FIG. 4, a conversion gain variable operation according to an operation mode may be performed in a single pixel. The present inventive concepts need not be limited thereto. The conversion gain variable operation may be performed in a unit pixel group.

Figure 5:
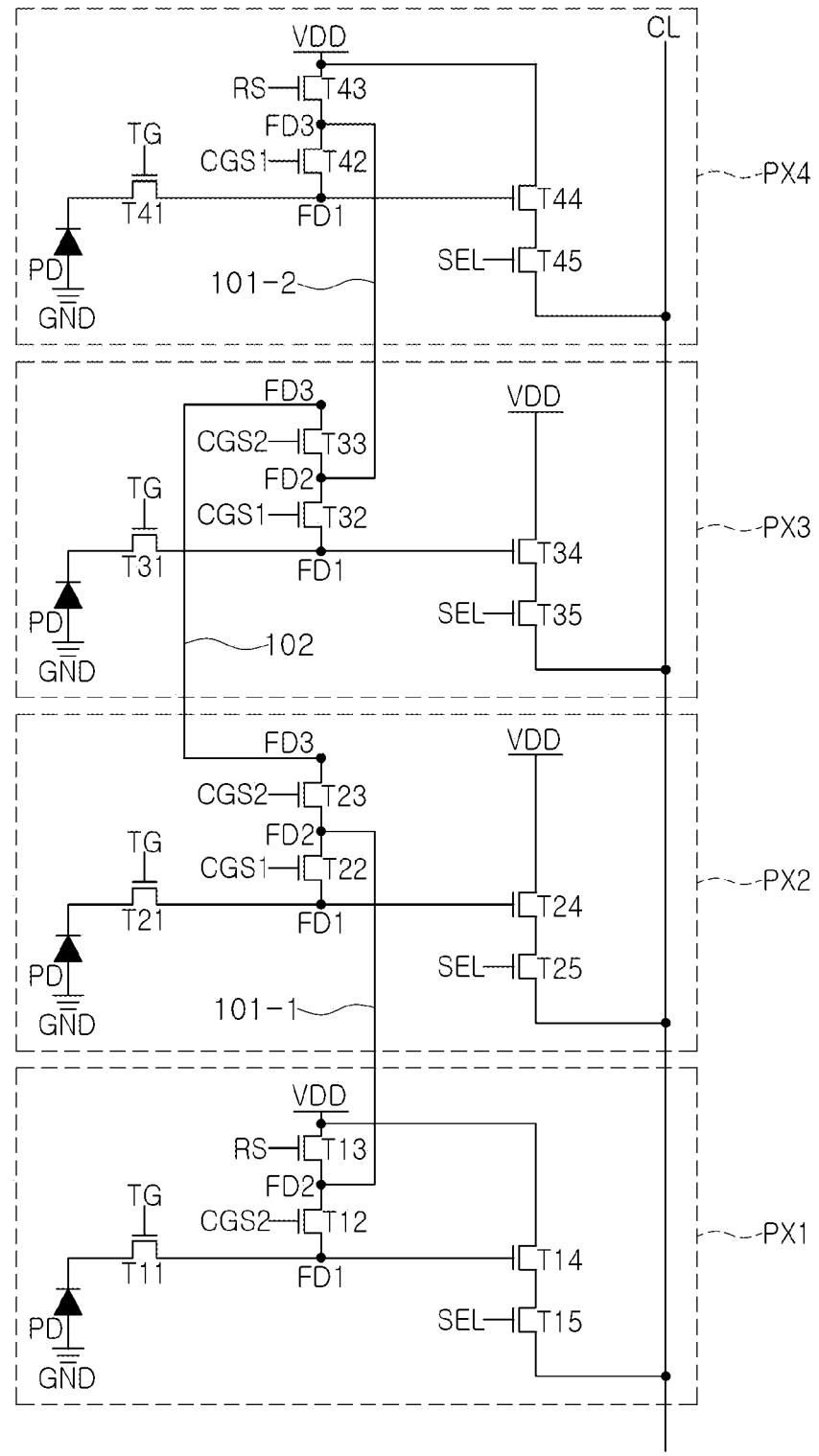
FIG. 5 is a view illustrating a unit pixel group PXG according to example embodiments of the present inventive concepts.

FIG. 5 is a view illustrating a unit pixel group PXG according to example embodiments of the present inventive concepts. Referring to FIG. 5, a pixel group PXG may include four (4) pixels PX1 to PX4 connected to one (1) column line CL.

A first pixel PX1 may include a photodiode PD, a first transistor T11, a second transistor T12, a third transistor T13, a fourth transistor T14, and/or a fifth transistor T15. The first transistor T11 may be connected between the photodiode PD and a first floating node FD1 of the first pixel PX1, and may include a gate receiving a transfer gate signal TG. The second transistor T12 may be connected between the first floating node FD1 of the first pixel PX1 and a second floating node FD2 of the first pixel PX1, and may include a gate receiving a first conversion gain signal CGS1. The third transistor T13 may be connected between a power voltage VDD and the second floating node FD2 of the first pixel PX1, and may include a gate receiving a reset control signal RS. The fourth transistor T14 may include a drain connected to the power voltage VDD and a gate connected to the first floating node FD1 of the first pixel PX1. The fifth transistor T15 may include a drain connected to a source of the fourth transistor T14, a source connected to a column line CL, and a gate connected to a select signal SEL.

A second pixel PX2 may include a photodiode PD, a first transistor T21, a second transistor T22, a third transistor T23, a fourth transistor T24, and/or a fifth transistor T25. The first transistor T21 may be connected between the photodiode PD and a first floating node FD1 of the second pixel PX2, and may include a gate receiving a transfer gate signal TG. The second transistor T22 may be connected between the first floating node FD1 of the second pixel PX2 and a second floating node FD2 of the second pixel PX2, and may include a gate receiving a first conversion gain signal CGS1. In some example embodiments, the second floating node FD2 of the second pixel PX2 may be connected to the second floating node FD2 of the first pixel PX1 through a metal line 101-1. The third transistor T23 may be connected between the second floating node FD2 of the second pixel PX2 and a third floating node FD3 of the second pixel PX2, and may include a gate receiving a second conversion gain signal CGS2. The fourth transistor T24 may include a drain connected to a power voltage VDD and a gate connected to the first floating node FD1 of the second pixel PX2. The fifth transistor T25 may include a drain connected to a source of the fourth transistor T24, a source connected to the column line CL, and a gate connected to a select signal SEL.

A third pixel PX3 may include a photodiode PD, a first transistor T31, a second transistor T32, a third transistor T33, a fourth transistor T34, and/or a fifth transistor T35. The first transistor T31 may be connected between the photodiode PD and a first floating node FD1 of the third pixel PX3, and may include a gate receiving a transfer gate signal TG. The second transistor T32 may be connected between the first floating node FD1 of the third pixel PX3 and a second floating node FD2 of the third pixel PX3, and may include a gate receiving a first conversion gain signal CGS1. The third transistor T33 may be connected between the second floating node FD2 of the third pixel PX3 and a third floating node FD3 of the third pixel PX3, and may include a gate receiving a second conversion gain signal CGS2. In some example embodiments, the third floating node FD3 of the third pixel PX3 may be connected to the third floating node FD3 of the second pixel PX2 through a metal line 102. The fourth transistor T34 may include a drain connected to a power voltage VDD and a gate connected to the first floating node FD1 of the third pixel PX3. The fifth transistor T35 may include a drain connected to a source of the fourth transistor T34, a source connected to the column line CL, and a gate connected to a select signal SEL.

A fourth pixel PX4 may include a photodiode PD, a first transistor T41, a second transistor T42, a third transistor T43, a fourth transistor T44, and/or a fifth transistor T45. The first transistor T41 may be connected between the photodiode PD and a first floating node FD1 of the fourth pixel PX4, and may include a gate receiving a transfer gate signal TG. The second transistor T42 may be connected between the first floating node FD1 of the fourth pixel PX4 and a second floating node FD2 of the fourth pixel PX4, and may include a gate receiving a first conversion gain signal CGS1. The third transistor T43 may be connected between a power voltage VDD and the second floating node FD2 of the fourth pixel PX4, and may include a gate receiving a reset control signal RS. In some example embodiments, the second floating node FD2 of the fourth pixel PX4 may be connected to the second floating node FD2 of the third pixel PX3 through a metal line 101-2. The fourth transistor T44 may include a drain connected to the power voltage VDD and a gate connected to the first floating node FD1 of the fourth pixel PX4. The fifth transistor T45 may include a drain connected to a source of the fourth transistor T44, a source connected to the column line CL, and a gate connected to a select signal SEL.

The pixels PX1 to PX4 illustrated in FIG. 5 may include five (5) transistors, respectively. It should be understood that the number of transistors constituting a pixel of the present inventive concepts is not limited thereto.

The pixels PX1 to PX4 illustrated in FIG. 5 may be respectively connected to a single photodiode. It should be understood that pixels of the present inventive concepts are not limited thereto.

A unit pixel group according to example embodiments of the present inventive concepts may be implemented in various color patterns.

Figures 6A, 6B, 6C, 6D:
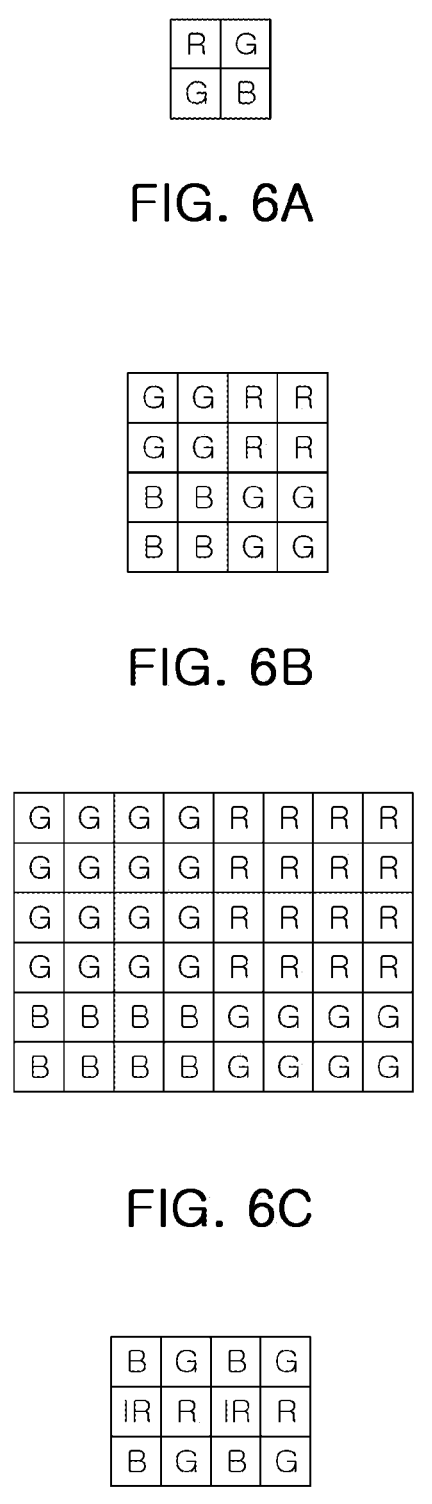

FIG. 6A is a view illustrating a pixel configured to have a 2×2 Bayer pattern, FIG. 6B is a view illustrating a pixel configured to have a 4×4 tetra pattern, FIG. 6C is a view illustrating a pixel configured to have an 8×8 Q-cell pattern, and FIG. 6D is a view illustrating a pixel having an infrared light (IR) sub-pixel.

A Bayer pattern illustrated in FIGS. 6A, 6B, 6C, and 6D may include a red sub-pixel R, a blue sub-pixel B, and a green sub-pixel G. It should be understood that a Bayer pattern of the present inventive concepts is not limited thereto. A Bayer pattern of the present inventive concepts may be variously configured by appropriately arranging a red sub-pixel R, a blue sub-pixel B, a green sub-pixel G, or a white sub-pixel W.

A pixel group according to example embodiments of the present inventive concepts may include lenses of various sizes.

Figure 7A:
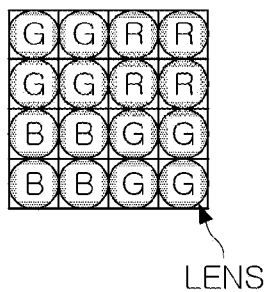
FIG. 7A is a view illustrating a tetrapixel having lenses respectively corresponding to color sub-pixels.
Figure 7B:
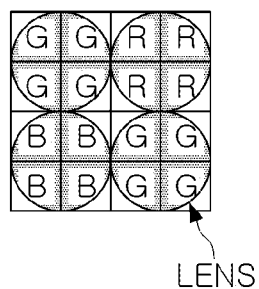
FIG. 7B is a view illustrating a tetrapixel having lenses corresponding to four identical color sub-pixels.
Figure 7C:
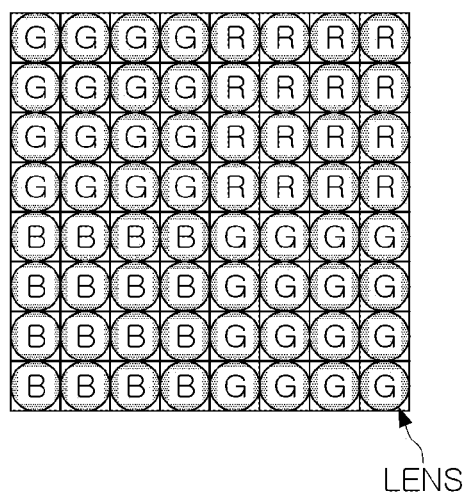
FIG. 7C is a view illustrating a 4×4 color filter pixel having lenses respectively corresponding to 1×1 sub-pixels.
Figure 7D:
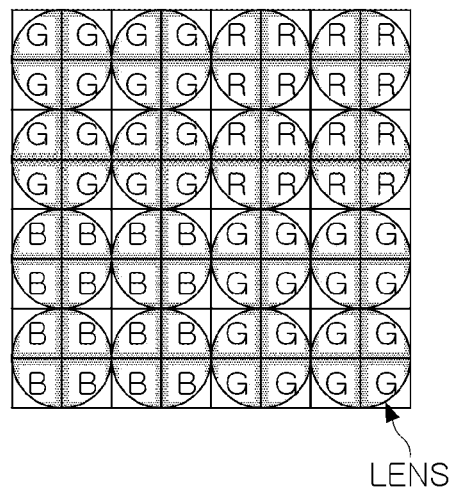
FIG. 7D is a view illustrating a 4×4 color filter pixel having lenses corresponding to 2×2 sub-pixels.
Figure 7E:
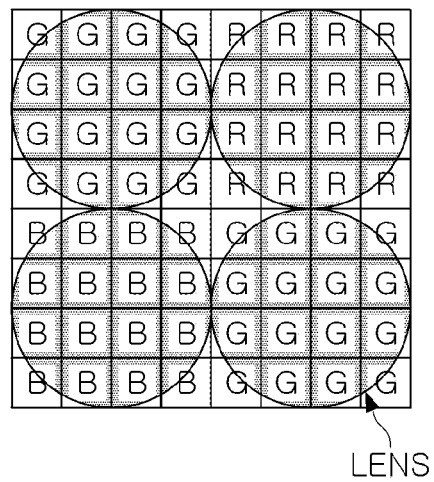
FIG. 7E is a view illustrating a 4×4 color filter pixel having lenses corresponding to 4×4 sub-pixels.

FIG. 7A is a view illustrating a tetrapixel having lenses respectively corresponding to color sub-pixels, FIG. 7B is a view illustrating a tetrapixel having lenses corresponding to four identical color sub-pixels, FIG. 7C is a view illustrating a 4×4 color filter pixel having lenses respectively corresponding to 1×1 sub-pixels, FIG. 7D is a view illustrating a 4×4 color filter pixel having lenses corresponding to 2×2 sub-pixels, and FIG. 7E is a view illustrating a 4×4 color filter pixel having lenses corresponding to 4×4 sub-pixels.

It should be understood that sizes of color filter pixels and lenses corresponding thereto, illustrated in FIGS. 7A, 7B, 7C, 7D, and 7E, are only illustrative.

A pixel PX according to example embodiments of the present inventive concepts may be implemented to have a 2-PD structure that shares a single floating diffusion region.

Figure 8A:
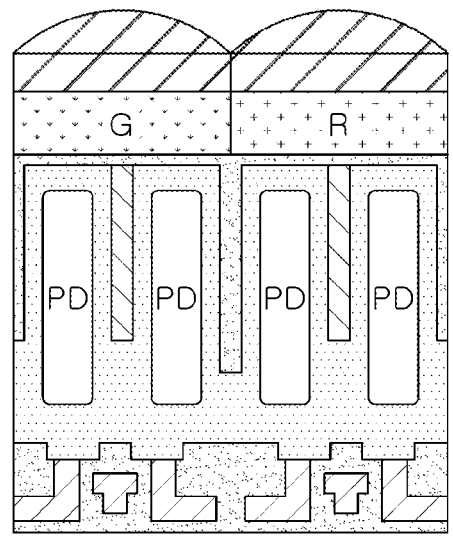
FIGS. 8A and 8B are views illustrating pixels having a 2-PD structure.
Figure 8B:
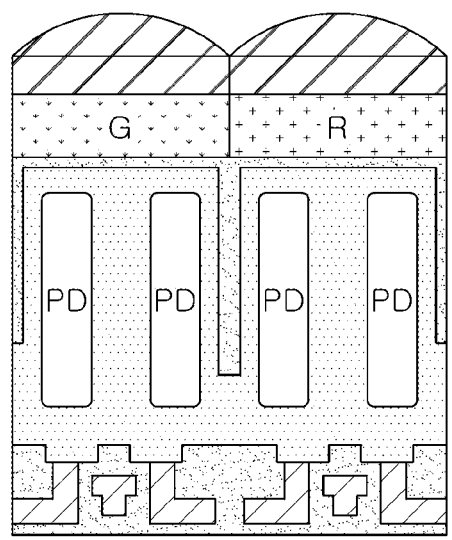

FIGS. 8A and 8B are views illustrating pixels having a 2-PD structure. Referring to FIG. 8A, a 2-PD pixel may separate a left PD and a right PD by in-pixel deep trench isolation (DTI), and referring to FIG. 8B, a 2-PD pixel may separate a left PD and a right PD by a PN junction.

A floating diffusion region FD may be commonly connected to a pair of left and right PDs arranged in the pixel. For example, a first floating diffusion region FD1 may be commonly connected to four (4) photoelectric conversion elements. The floating diffusion region FD may include, for example, an N-type impurity. First and second transfer gates TG1 and TG2 arranged on a substrate of a first pixel PX1, and first and second transfer gates TG1 and TG2 disposed on a substrate of a second pixel PX2 may share the floating diffusion region FD.

Figure 9:
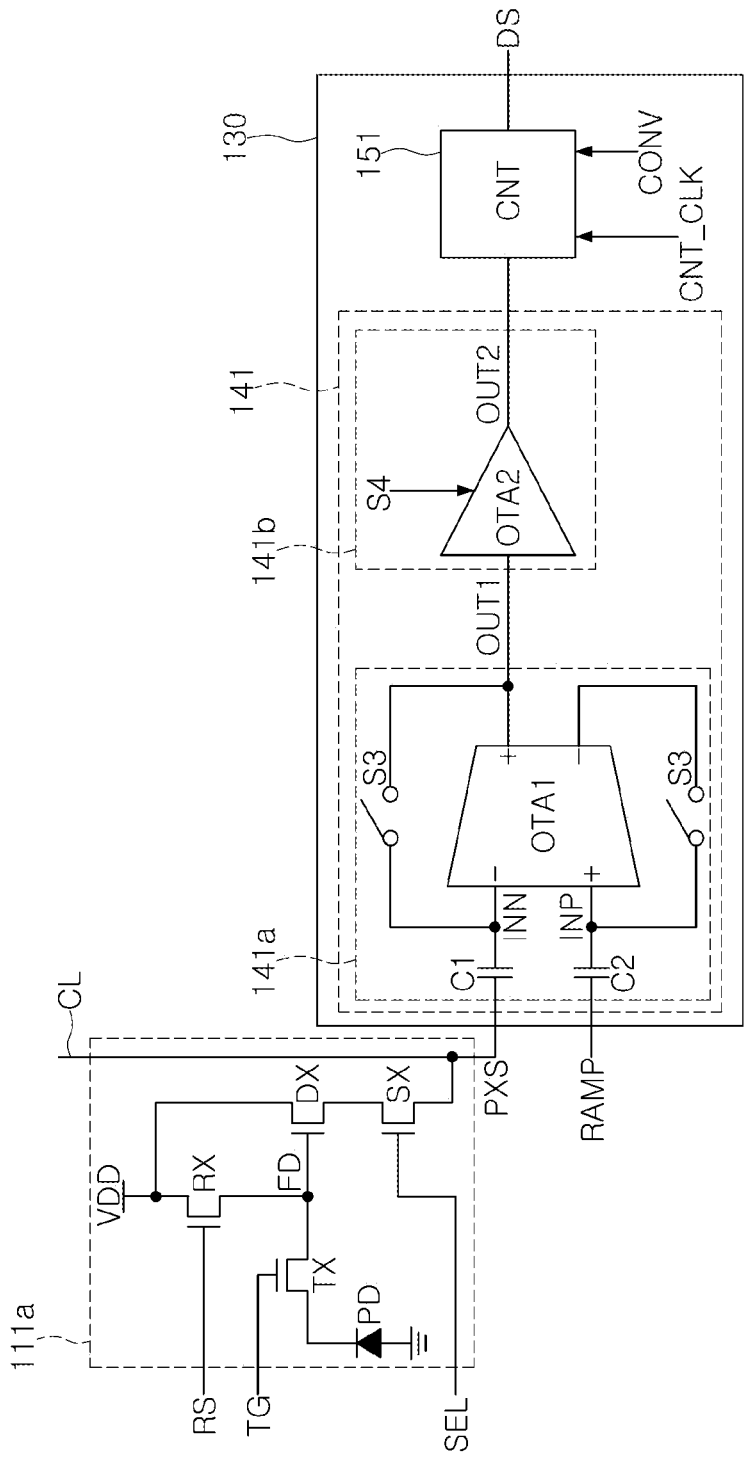
FIG. 9 is a view illustrating an ADC 130 according to example embodiments of the present inventive concepts.

FIG. 9 is a view illustrating an ADC 130 according to example embodiments of the present inventive concepts.

Referring to FIG. 9, an ADC 130 may include a comparator 141 and/or a counter 151. As illustrated in FIG. 9, a single comparator 141 and a single counter 151 connected to a single column line CL may be illustrated. As described in FIG. 2, the ADC 130 may include a plurality of comparison circuits and a plurality of counters connected to a plurality of column lines.

The comparator 141 may include a first amplifier 141*a* and OTA1 and a second amplifier 141*b* and OTA2.

The first amplifier OTA1 may be implemented to compare a pixel signal PXS and a ramp signal RAMP, received through input capacitors C1 and C2, and output a comparison result. A first input node INN (−) of the first amplifier OTA1 may receive the pixel signal PXS, and a second input node INP (+) of the first amplifier OTA1 may receive the ramp signal RAMP.

The first amplifier OTA1 may include first and second input capacitors C1 and C2, first and second switches SW1 and SW2, and a differential amplifier.

In some example embodiments, the first and second switches SW1 and SW2 may remove an offset of the first amplifier OTA1 in response to a switch control signal S3 (e.g., a first switch control signal). In some example embodiments, the first switch SW1 may be connected between the first input node INN and an output node OC, and the second switch SW2 may be connected between the second input node INP and a comparison node.

The second amplifier OTA2 may be implemented to amplify an output OUT1 (e.g., a first output signal) of the first amplifier OTA1. In some example embodiments, the second amplifier OTA2 may include a differential amplifier. An output OUT2 of the second amplifier OTA2 as a comparison result signal may be provided to the counter 151. In some example embodiments, an offset of the second amplifier OTA2 may be removed in response to a switch control signal S4.

In addition, the comparator 141 may be initialized in response to an auto zero signal (e.g., S3, S4, or the like) in an auto-zero section before performing a comparison operation. In addition, the comparator 141 may control a bias current or a bias voltage in response to the switch control signals S3 and S4, while performing the comparison operation.

The counter 151 may be implemented to count the comparison result signal OUT2 (e.g., a second output signal) based on a counting clock signal CNT_CLK and an conversion signal CONV, and output a counted digital signal DS. The digital signal DS may have an image component from which a reset component is removed from the pixel signal PXS, e.g., a digital value corresponding to an image signal.

Figure 10:
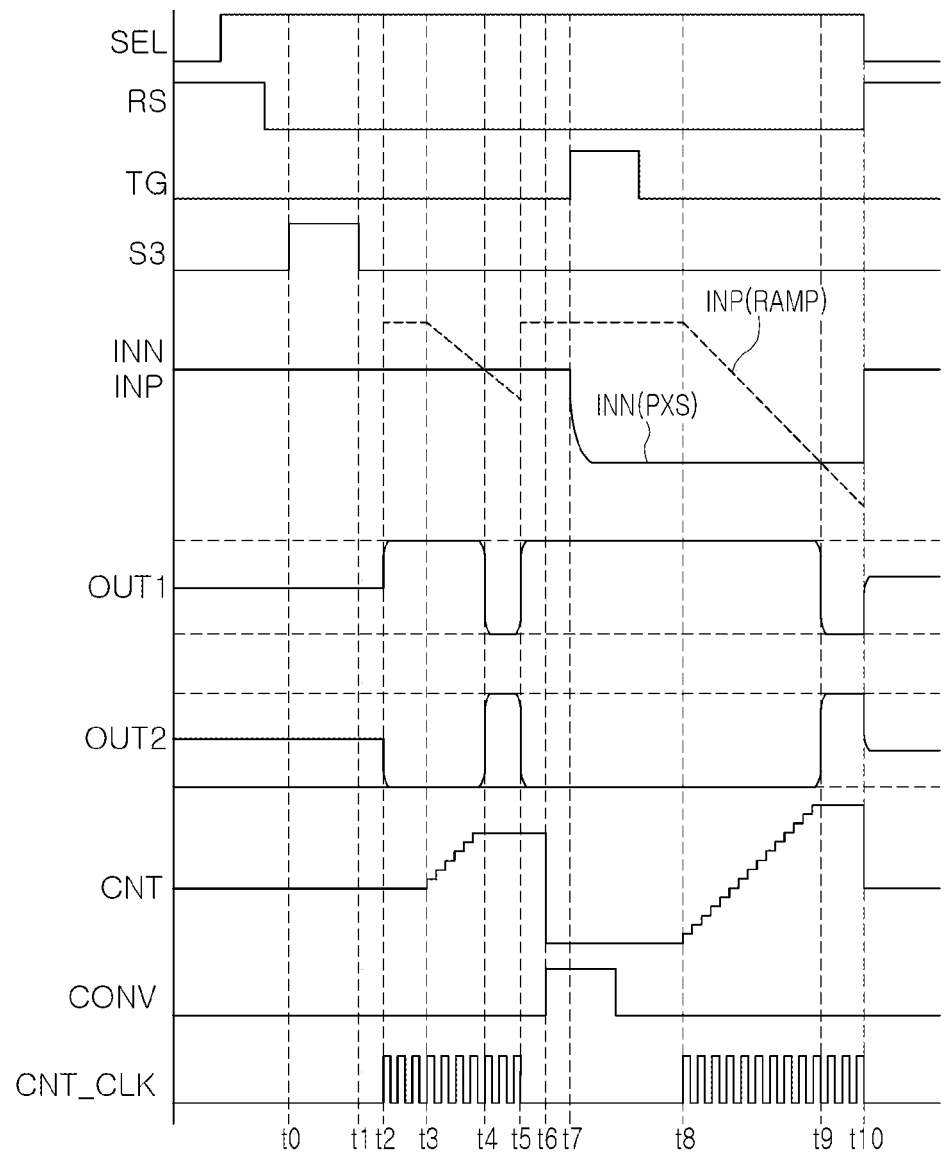
FIG. 10 is a view illustrating timing of the ADC 130 illustrated in FIG. 9.

FIG. 10 is a view illustrating timing of the ADC 130 illustrated in FIG. 9.

Referring to FIG. 10, from a point in time t0 to a point in time t1 may be defined as an auto zero section, and from the point in time t1 to point in time t10 may be defined as a comparison operation section.

An auto zero signal AZS may be activated from the point in time t0 to the point in time t1. In response to the auto zero signal AZS, the comparator 141 may be initialized. For example, input nodes and/or output nodes of the first amplifier OTA1 and the second amplifier OTA2 may have the same level. For digital conversion of a reset signal, after an offset may be applied to the ramp signal RAMP at a point in time t2, the ramp signal RAMP may decrease from a point in time t3. The counter 151 may count the counting clock signal CNT_CLK from the point in time t3 to a point in time t4, when polarity of the second output OUT2, the output of the second amplifier OTA2, changes.

When the digital conversion of the reset signal is completed, in order to convert an image signal into a digital signal at a point in time t5, an offset may be applied again to the ramp signal RAMP at the point in time t5, and then in response to the conversion signal CONV at a point in time t6, bits of the counter 151 may be converted. At a point in time t7, the transmission control signal TG may be turned on, and, during that time, the second input IN1N of the first amplifier OTA1 may be changed due to charges accumulated by the photosensor PD, as illustrated.

For digital conversion of an image signal, the ramp signal RAMP may decrease at a point in time t8. The counter 151 may count the counting clock signal CNT_CLK from the point in time t8 to a point in time t9, when polarity of the second output OUT2, the output of the second amplifier OTA2, changes. In some example embodiments, the counter 151 is illustrated to convert an image signal into a digital signal by bit-conversion and up-counting, but may not be limited thereto, and the counter 151 may be implemented in various manners. When the digital conversion of the image signal is completed, the ADC 130 may be initialized for correlated double sampling for a next pixel PX.

It should be understood that operation timing of the ADC 130 illustrated in FIG. 10 is only illustrative. Various operation timing may be implemented according to structures of the first and second amplifiers OTA1 and OTA2.

Figure 11:
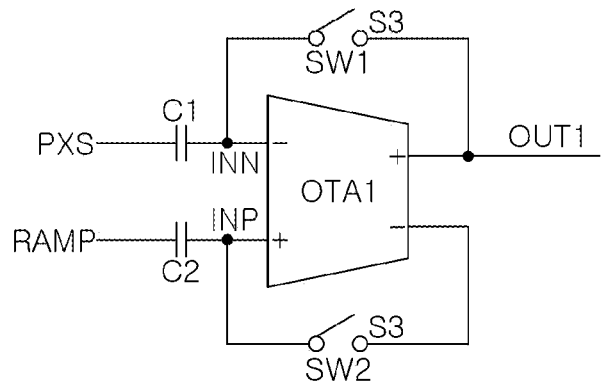
FIG. 11 is a view illustrating a first amplifier OTA1 according to example embodiments of the present inventive concepts.

FIG. 11 is a view illustrating a first amplifier OTA1 according to example embodiments of the present inventive concepts. Referring to FIG. 11, a first amplifier OTA1 may include a first differential amplifier OTA1 and/or switches SW1 and SW2.

A first switch SW1 may connect a first input node INN of the first amplifier OTA1 and an output node OC in response to a switch control signal S3. A second switch SW2 may connect a second input node INP of the first amplifier OTA1 and a comparison node in response to the switch control signal S3. For example, the first switch SW1 may be turned on in response to the switch control signal S3 to connect the first input node INN of the first amplifier OTA1 and the output node OC, and the second switch SW2 may be turned on in response to the switch control signal S3 to connect the second input node INP of the first amplifier OTA1 and the comparison node.

As the switches SW1 and SW2 may be turned on in an auto zero section (e.g., from the point in time t0 to the point in time t1 in FIG. 10), an offset of the first amplifier OTA1 may be cancelled.

The first differential amplifier OTA1 may be implemented as an operational transconductance amplifier (OTA), an operational amplifier, or the like.

Thereafter, in a comparison operation section (e.g., from the point in time t1 to the point in time t10 in FIG. 10), the first amplifier OTA1 may operate based on a first bias current.

Figure 12:
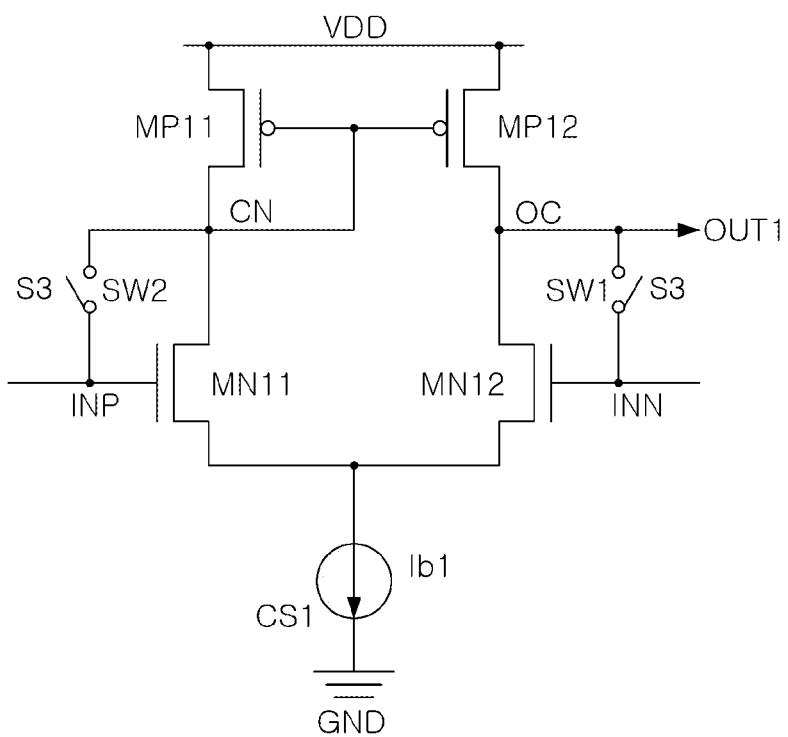
FIG. 12 is a view illustrating a circuit of the first amplifier OTA1 illustrated in FIG. 11.

FIG. 12 is a view illustrating a circuit of the first amplifier OTA1 illustrated in FIG. 11. Referring to FIG. 12, the first amplifier OTA1 may include the first and second switches SW1 and SW2, input transistors MN11 and MN12, output transistors MP11 and MP12, and/or a first current source CS1.

A first transistor MP11 may be connected between a power terminal VDD and the comparison node CN, and a second transistor MP12 may be connected between the power terminal VDD and the output node OC. In some example embodiments, each of the first and second transistors MP11 and MP12 may include a PMOS transistor. In some example embodiments, each of the first and second transistors MP11 and MP12 may include a gate connected to the comparison node CN.

A third transistor MN11 may be connected between the comparison node CN and a first bias node BN1, and a fourth transistor MN12 may be connected between the output node OC and the first bias node BN1. In some example embodiments, each of the third and fourth transistors MN11 and MN12 may include an NMOS transistor. The third transistor MN11 may include a gate connected to the second input node INP receiving the ramp signal RAMP. The fourth transistor MN12 may include a gate connected to the first input node INN receiving the pixel signal PXS.

The first current source CS1 may be connected between the first bias node BN1 and a ground terminal GND. The first current source CS1 may flow a first bias current Ib1 in the comparison operation section.

The first switch SW1 may be connected between the first input node INN and the output node OC. The second switch SW2 may be connected between the second input node INP and the comparison node CN.

It should be understood that the first amplifier OTA1 illustrated in FIG. 12 is only illustrative.

Figure 13:
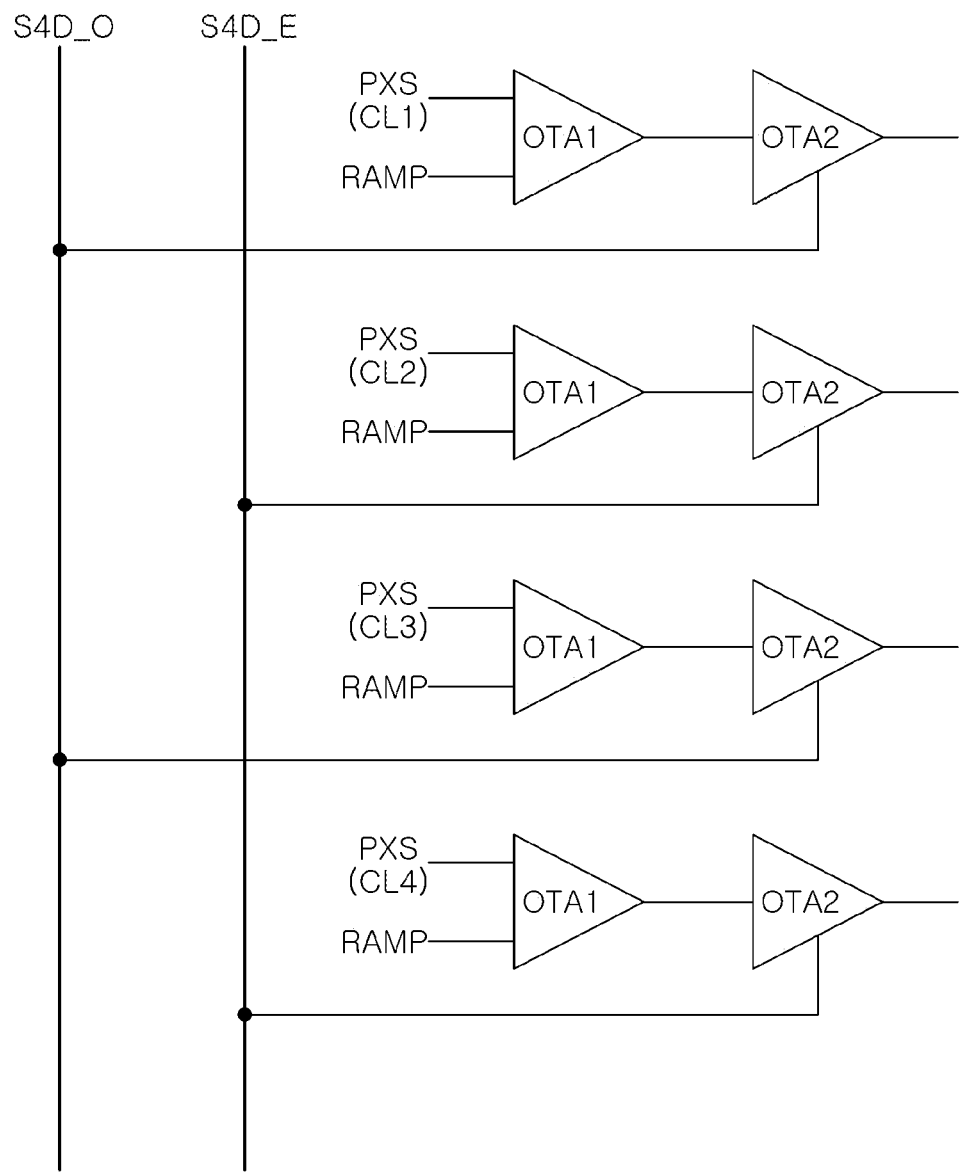
FIG. 13 is a view conceptually illustrating a switch control split operation of a comparison circuit 140 according to example embodiments of the present inventive concepts.

FIG. 13 is a view conceptually illustrating a switch control split operation of a comparison circuit 140 according to example embodiments of the present inventive concepts.

In general, a comparator of a comparison circuit 140 (CDS) may include a first amplifier OTA1 and a second amplifier OTA2. Among them, the second amplifier OTA2 may include a dummy switch and a self-bias switch for determining an operating point by self-bias during an auto zero operation.

The self-bias switch may be turned on in response to a switch control signal S4 in an auto zero section, to determine bias of the second amplifier OTA2. Thereafter, the self-bias switch may be turned off in a comparison operation section. In some example embodiments, a voltage of a bias node of the second amplifier OTA2 may be changed by charge injection/clock feedthrough phenomenon. The dummy switch may be turned on in response to a switch control signal S4D, to inversely compensate a bias voltage.

A comparison circuit 140 according to example embodiments of the present inventive concepts may split switch control of the dummy switch for compensating for charge injection and clock feedthrough phenomenon of an auto zero switch into even/odd numbers. In addition, presence or absence of a compensation operation by the even-numbered and odd-numbered dummy switches may be split, to change voltages stored in an even bias node BN_E and an odd bias node BN_O after the auto zero operation. Therefore, a decision rate of the second amplifier OTA2 may be changed according to the even/odd number. Finally, a CDS decision of the comparison circuit 140 may be split.

Figure 14A:
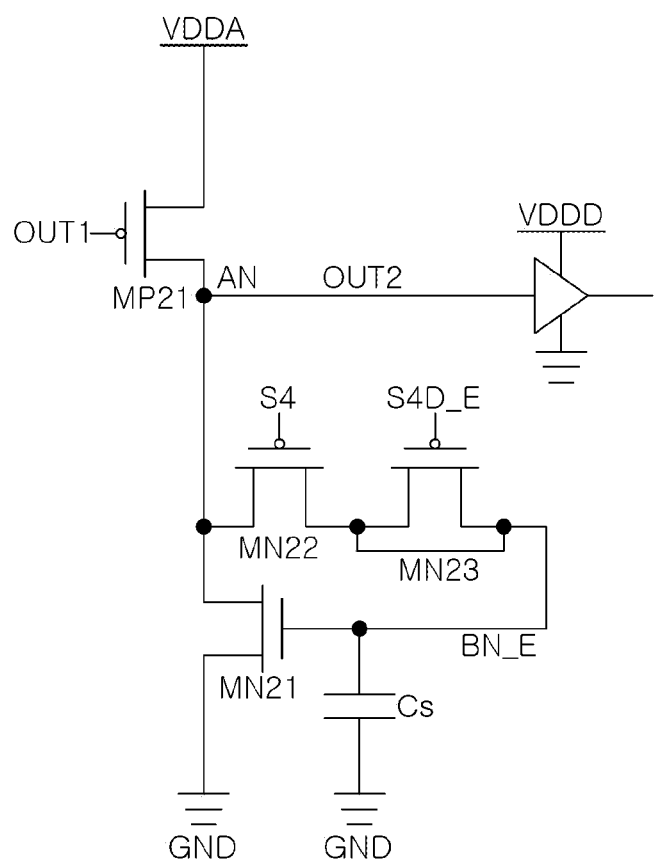
FIGS. 14A and 14B are views illustrating a second amplifier OTA2 corresponding to an even-numbered column line and a second amplifier OTA2 corresponding to an odd-numbered column line, according to example embodiments of the present inventive concepts.
Figure 14B:
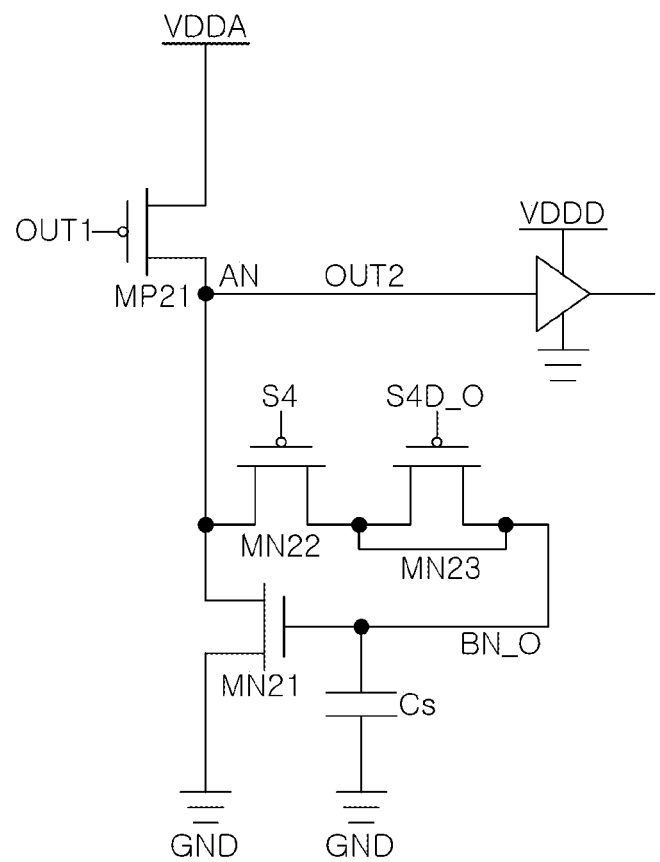

FIGS. 14A and 14B are views illustrating a second amplifier OTA2 corresponding to an even-numbered column line and a second amplifier OTA2 corresponding to an odd-numbered column line, according to example embodiments of the present inventive concepts. Referring to FIGS. 14A and 14B, a second amplifier OTA2 may include bias transistors MN21, MN22, and MN23 and an amplifying transistor MP21.

The amplifying transistor MP21 may be connected between a power terminal VDD and an amplification node AN. The amplifying transistor MP21 may include a gate receiving an output OUT1 of a first amplifier OTA1. In some example embodiments, the amplifying transistor MP21 may include a PMOS transistor.

The first bias transistor MN21 may be connected between the amplification node AN and a ground terminal GND. The first bias transistor MN21 may include a gate connected to a second bias node BN2. The first bias transistor MN21 may include an NMOS transistor.

A second bias transistor MN22 (e.g., a self-bias transistor) may be connected between the amplification node AN and the second bias node BN2. The second bias transistor MN22 may include a gate receiving a switch control signal S4. The switch control signal S4 may be an auto zero signal. The second bias transistor MN22 may include a PMOS transistor. The second bias transistor MN22 may function as an auto zero switch.

A third bias transistor MN23 (e.g., an inverse compensation bias transistor) may include a gate receiving a switch control signal S4D, and a source and a drain, connected to the second bias node BN2. The third bias transistor MN23 may include a PMOS transistor. In some example embodiments, the second bias transistor MN23 (e.g., a self-bias transistor) may function as a dummy switch for compensating a current of the auto zero switch in the comparison operation section.

Referring to FIGS. 14A and 14B, a switch control signal S4D_E received from a dummy transistor MN23 corresponding to an even-numbered column line, and a switch control signal S4D_O received from the dummy transistor MN23 corresponding to an odd-numbered column line, may be split.

Figure 15:
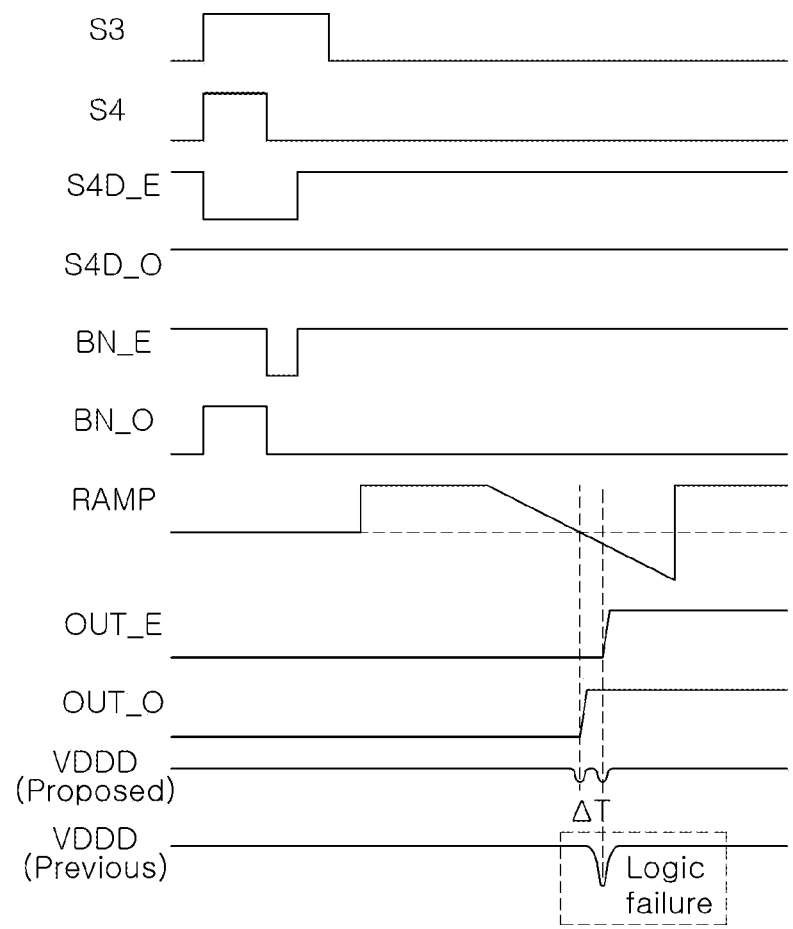
FIG. 15 is a view illustrating timing of a bias operation of a comparator according to example embodiments of the present inventive concepts.

FIG. 15 is a view illustrating timing of a bias operation of a comparator according to example embodiments of the present inventive concepts.

In a conventional image sensor, a dummy switch control signal provided to a second amplifier OTA2 may be configured as one signal. Therefore, logic of data bus in a column may be toggled at the same time for all output values to increase IR-drop/rise.

However, an image sensor 100 according to example embodiments of the present inventive concepts may distinguish a dummy switch control signal of a second amplifier OTA2 into an even number and an odd number. As a result, an output OUT_E of a comparator corresponding to an even-numbered column line and an output OUT_O of a comparator corresponding to an odd-numbered column line may be distributed. As a result, timing at which logic of DBS are toggled according to timing of the outputs OUT_E and OUT_O may be distributed. Therefore, at a low voltage (VDDD), IR-drop/rise may decrease, as compared to that of the conventional IR-drop/rise, and a margin of DBS LVCC may be improved.

Figure 16:
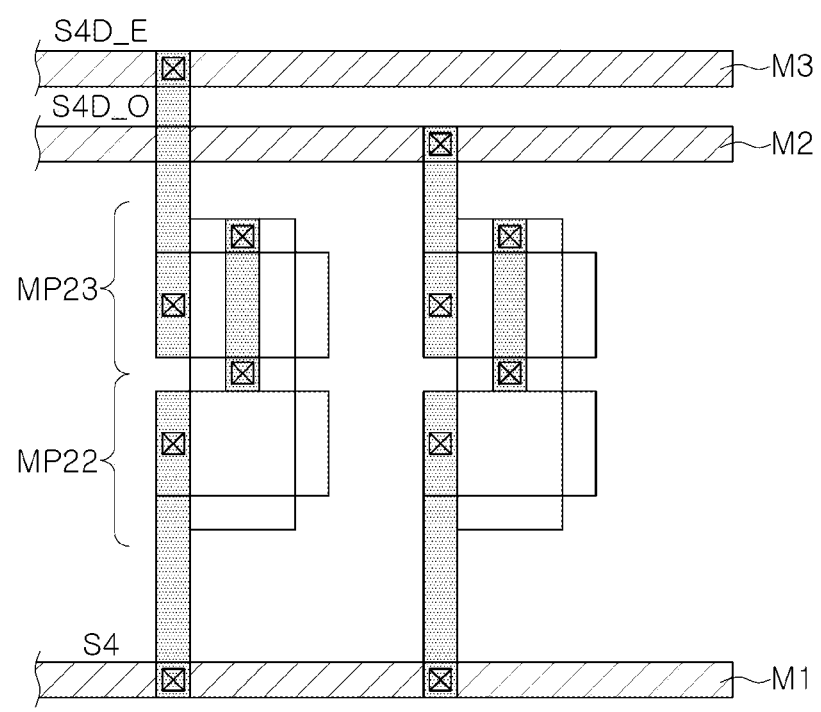
FIG. 16 is a view illustrating a process cross-section of a portion of a second amplifier OTA2 according to example embodiments of the present inventive concepts.

FIG. 16 is a view illustrating a process cross-section of a portion of a second amplifier OTA2 according to example embodiments of the present inventive concepts. Referring to FIG. 16, a switch control signal S4 may be input by a first metal line M1, an even-numbered dummy switch control signal S4D_E may be input by a second metal line M2, and an odd-numbered dummy switch control signal S4D_O may be input by a third metal line M3.

In some example embodiments, at least two of the first to third metal lines M1, M2, and M3 may be formed on different layers.

Figure 17:
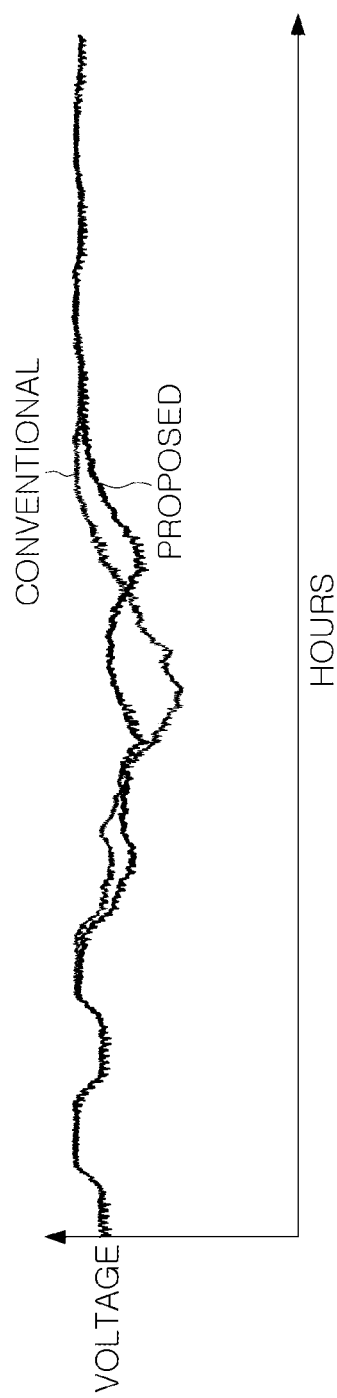
FIG. 17 is a view illustrating a data bus simulation result between example embodiments of the present inventive concepts and the conventional art.

FIG. 17 is a view illustrating a data bus simulation result between example embodiments of the present inventive concepts and the conventional art. Referring to FIG. 17, as CDS decision may be split from a structure of the present inventive concepts to decrease peak IR-drop of DBS, as compared to a conventional structure. These results may improve a margin of DBS LVCC.

The bias of the ADC described in FIGS. 13 to 17 may split a dummy switch control signal S4D into even/odd two (2) groups. The present inventive concepts need not be limited thereto. The present inventive concepts may divide the bias operation into three or more groups.

Figure 18:
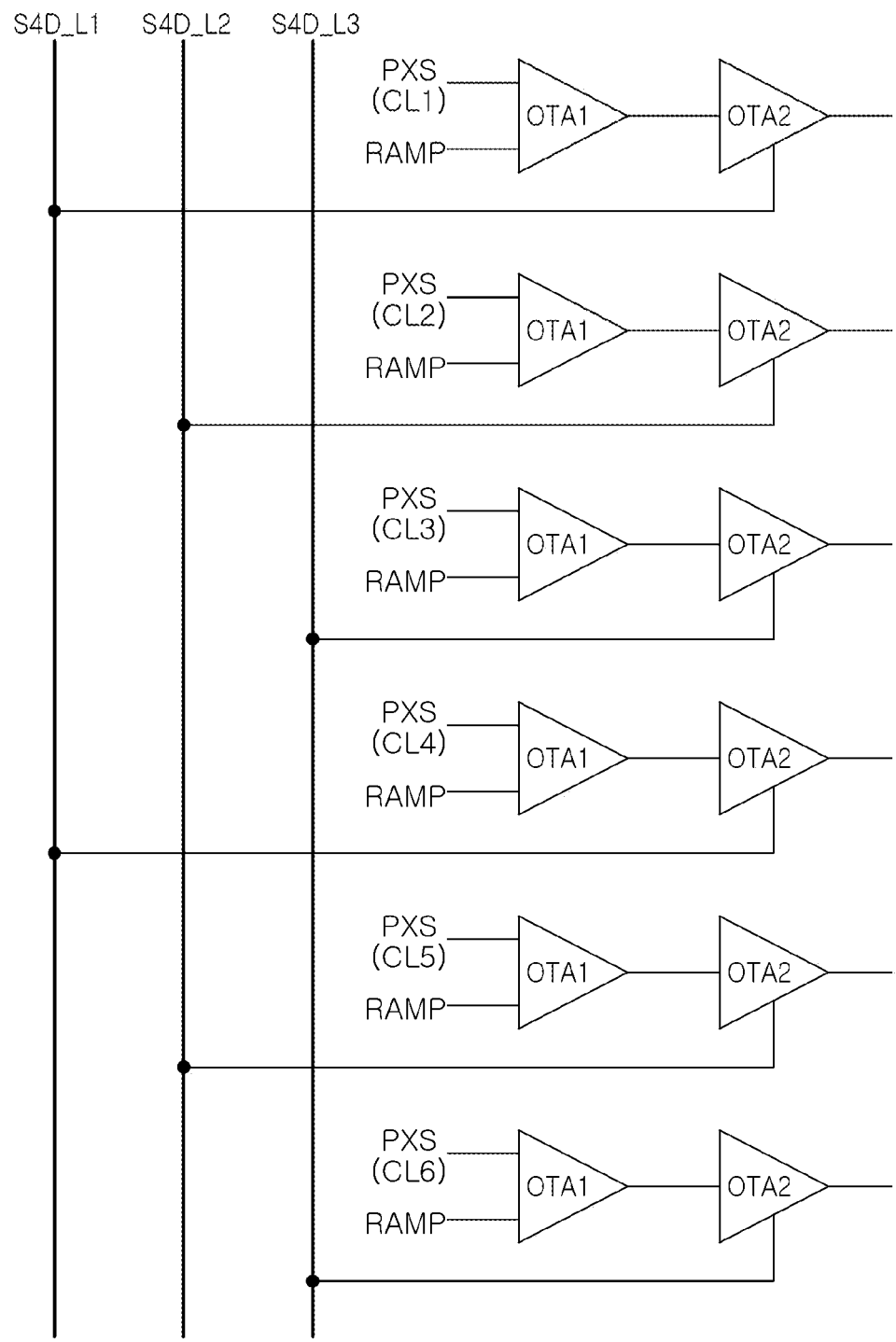
FIG. 18 is a view illustrating an ADC 130a according to example embodiments of the present inventive concepts.

FIG. 18 is a view illustrating an ADC 130a according to other example embodiments of the present inventive concepts. Referring to FIG. 18, an ADC 130a may include second amplifiers split into three (3) dummy switch control signals S4D_L1, S4D_L2, and S4D_L3, as compared to the ADC 130 illustrated in FIG. 13.

An image sensor 100 according to example embodiments of the present inventive concepts may be implemented to have a stacked structure.

Figure 19:
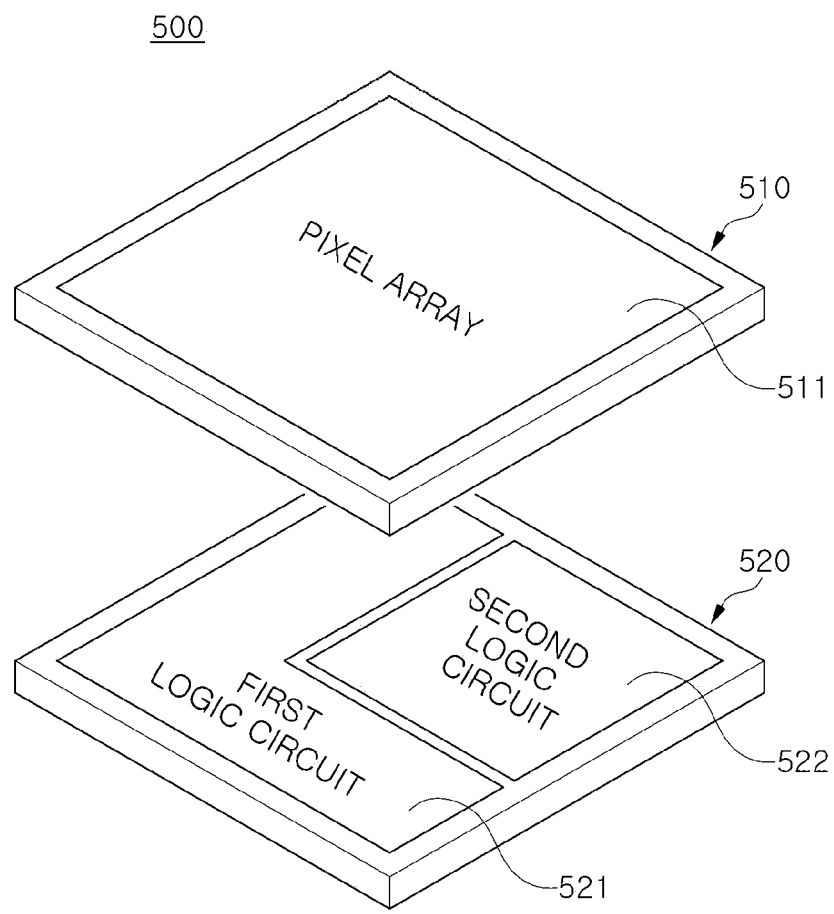
FIG. 19 is a view illustrating an image sensor 500 according to example embodiments of the present inventive concepts.

FIG. 19 is a view illustrating an image sensor 500 according to example embodiments of the present inventive concepts.

Referring to FIG. 19, an image sensor 500 may include a first layer 510 and a second layer 520. The first layer 510 and the second layer 520 may be stacked in a vertical direction.

The first layer 510 may include a pixel array 511, and the second layer 520 may include logic circuits 521 and 522. The pixel array 511 may include a plurality of pixels, and the plurality of pixels may be connected to the logic circuit 521 through a plurality of row lines and a plurality of column lines. In some example embodiments illustrated in FIG. 19, each of the pixels arranged in the pixel array 511 in the first layer 510 may include a pixel circuit, a first output circuit, and a second output circuit. Therefore, each of the pixels may have a structure similar to that of example embodiments described with reference to FIG. 17 above.

The logic circuits 521 and 522 may include a first logic circuit 521 and a second logic circuit 522. The first logic circuit 521 may include a row driver, a readout circuit, a column driver, a control logic, and/or the like, necessary for driving the pixel array 511. The second logic circuit 522 may include a power circuit, an input/output interface, an image signal processor, and/or the like. Areas, arrangements, and the like, occupied by each of the first and second logic circuits 521 and 522, may be variously modified.

The image sensor 500 illustrated in FIG. 19 may be implemented with two (2) layers 510 and 520 stacked. An image sensor of the present inventive concepts need not be limited to this. An image sensor of the present inventive concepts may be implemented with three (3) or more layers stacked.

Figure 20:
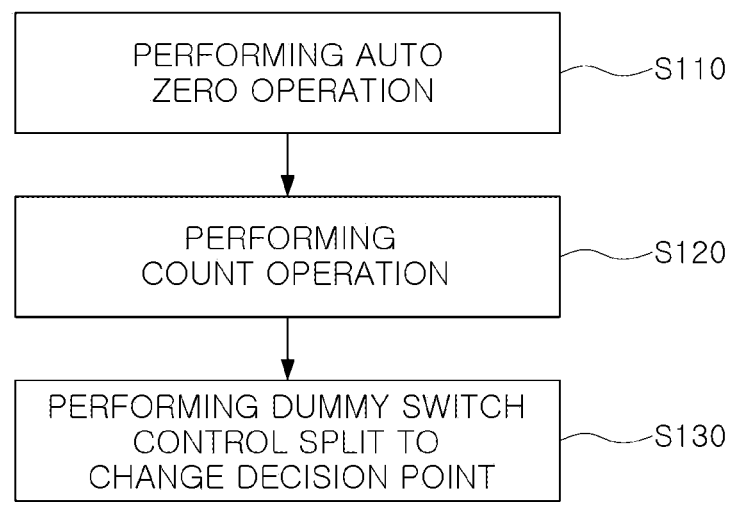
FIG. 20 is a flowchart illustrating operations of a CDS according to example embodiments of the present inventive concepts.

FIG. 20 is a flowchart illustrating operations of a CDS according to example embodiments of the present inventive concepts. Referring to FIGS. 1 to 20, operations of a CDS of an image sensor 100 may be performed as follows.

An auto zero operation may be performed on a comparator 141 of an ADC 130 (S110). Input voltages of the comparator 141 may be the same, according to the auto zero operation. Thereafter, a voltage PXS may be applied from a pixel PX, to perform a count operation by the ADC 130 in response to a ramp signal RAMP (S120). Thereafter, decision points may be distributed by dummy switch control split (S130). For example, by separating a control signal of a dummy switch S4D compensating for a bias voltage of a second amplifier OTA2 may be split in a unit of a column line group to distribute decision points. In some example embodiments, the column line group may include an odd-numbered column line group and an even-numbered column line group.

In a CDS operation of an image sensor 100 according to example embodiments of the present inventive concepts, a voltage sampled by a bias of the second amplifier OTA2 may be adjusted for each column line, to change a decision rate. As a result, peak IR-drop/rise of DBS may be reduced, and a margin of DBS LVCC may be improved.

In some example embodiments, the CDS operation of the image sensor 100 may control a degree to which the decision rate is split by charge injection/clock feedthrough values. A CDS operation of the present inventive concepts may be a structure that creates an offset on a rear stage of a comparison operation section, and may be thus used regardless of analog gain.

Figure 21:
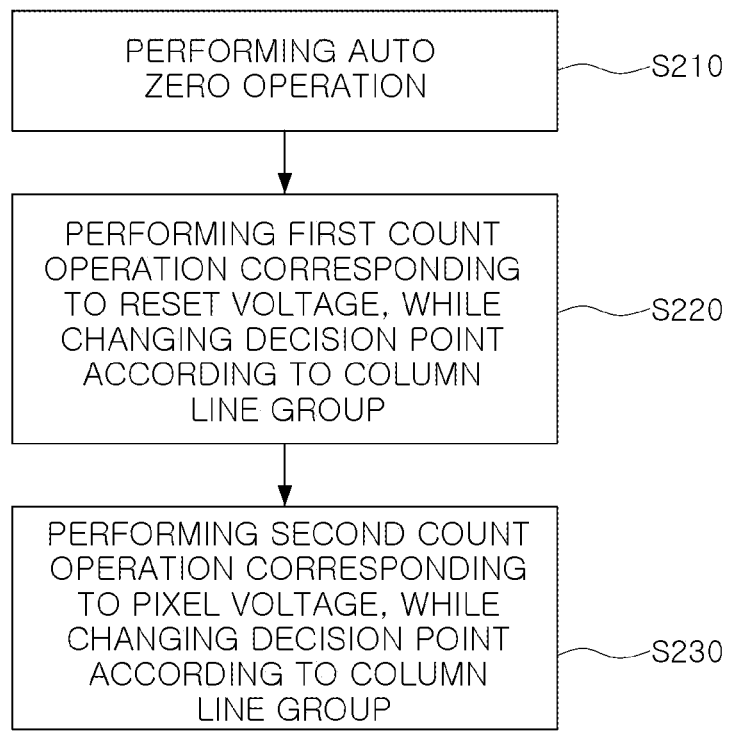
FIG. 21 is a flowchart illustrating operations of an ADC 130 according to example embodiments of the present inventive concepts.

FIG. 21 is a flowchart illustrating operations of an ADC 130 according to example embodiments of the present inventive concepts. Referring to FIGS. 1 to 21, operations of an ADC 130 may be performed as follows.

An auto zero operation may be performed on comparators connected to column lines, respectively (S210). A first count operation corresponding to a reset voltage may be performed while changing a decision point according to a column line group (S220). In some example embodiments, the decision point may be determined in a predetermined or alternatively, desired order according to the column line group. Thereafter, a second count operation corresponding to a pixel voltage may be performed while changing a decision point according to a column line group (S230).

Figure 22:
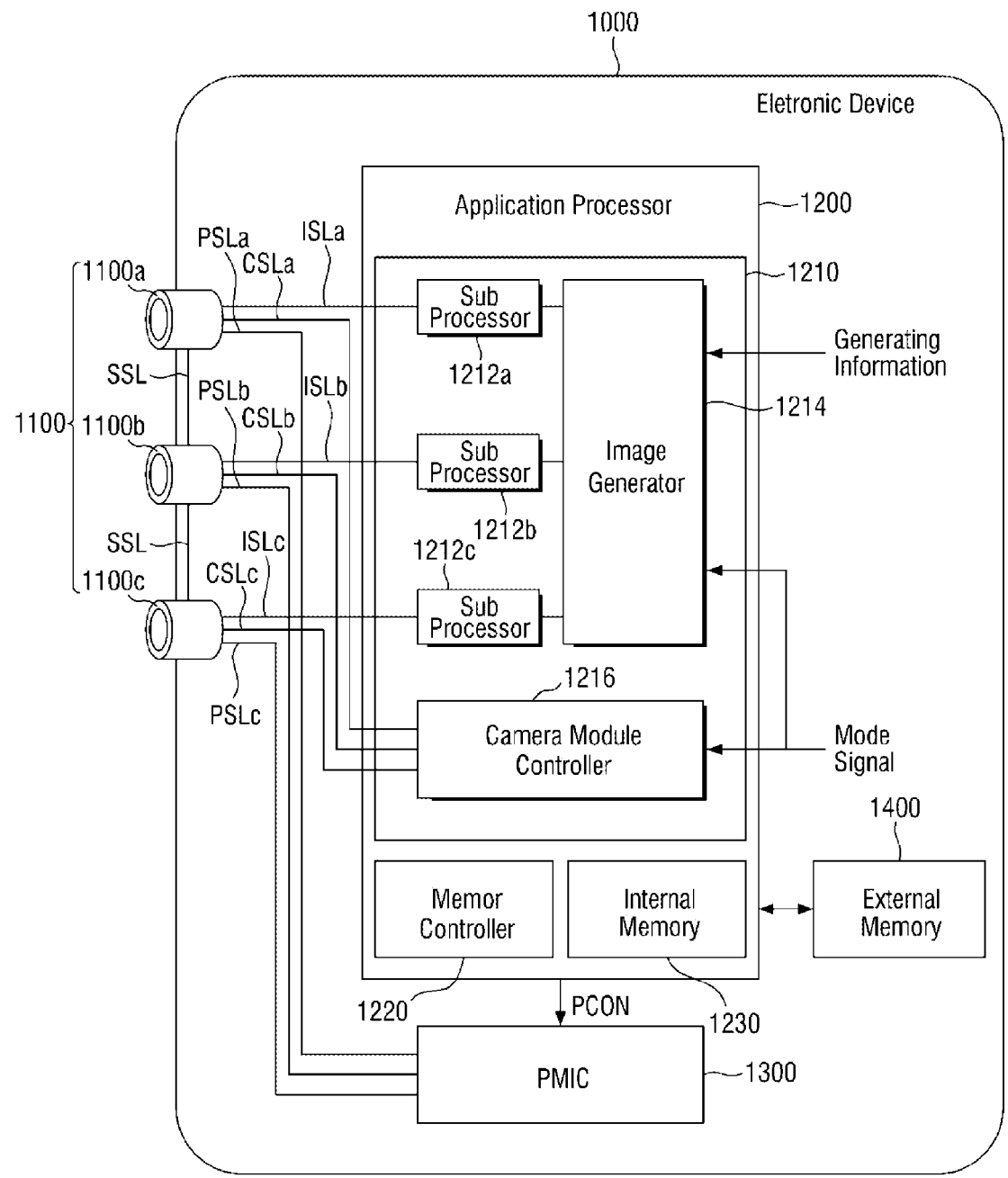
FIGS. 22 and 23 are views schematically illustrating an electronic device including an image sensor according to example embodiments of the present inventive concepts.
Figure 23:
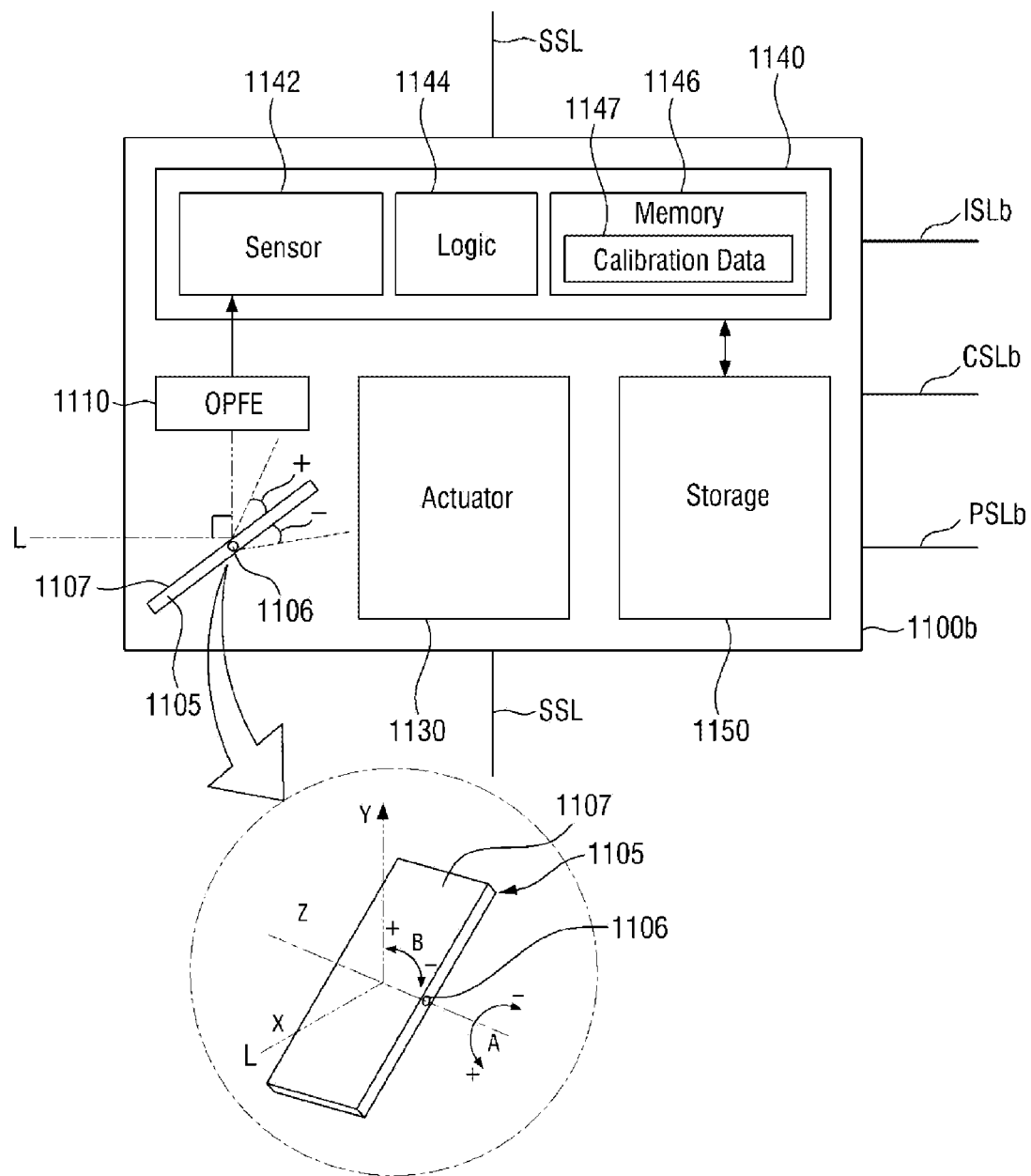

FIGS. 22 and 23 are views schematically illustrating an electronic device including an image sensor according to example embodiments of the present inventive concepts.

Referring to FIG. 22, the electronic device 1000 may include a camera module group 1100, an application processor 1200, a PMIC 1300, and/or an external memory 1400.

The camera module group 1100 may include a plurality of camera modules 1100a, 1100b, and 1100c. Although the drawing illustrates example embodiments in which three camera modules 1100a, 1100b, and 1100c are arranged, example embodiments are not limited thereto. In some example embodiments, the camera module group 1100 may be modified to include only two (2) camera modules. In addition, in some example embodiments, the camera module group 1100 may be modified and implemented to include n (where n is a natural number of 4 or more) camera modules. In addition, in some example embodiments, at least one of the plurality of camera modules 1100a, 1100b, and 1100c included in the camera module group 1100 may be implemented by the image sensors described in FIGS. 1 to 21 and CDS operations thereof.

Referring to FIG. 23, a configuration of the camera module 1100b will be described in more detail, but the following description may be equally applied to other camera modules 1100a and 1100c according to example embodiments. Referring back to FIG. 23, the camera module 1100b may include a prism 1105, an optical path folding element (hereinafter referred to as "OPFE") 1110, an actuator 1130, an image sensing device 1140, and/or a storage device 1150. The prism 1105 may include a reflective surface 1107 of a light reflecting material to change a path of light L externally incident.

In some example embodiments, the prism 1105 may change the path of the light L, incident in a first direction X, to a second direction Y, perpendicular to the first direction X. In addition, the prism 1105 may rotate the reflective surface 1107 of the light reflecting material in a direction A around a central axis 1106, or may rotate the central axis 1106 in a direction B, to change the path of the light L, incident in the first direction X, to the second direction Y, perpendicular thereto. In some example embodiments, the OPFE 1110 may also move in a third direction Z, perpendicular to the first direction X and the second direction Y.

In some example embodiments, as illustrated, a maximum rotation angle of the prism 1105 in the direction A may be 15 degrees or less in a positive (+) direction thereof, and may be greater than 15 degrees in a negative (−) direction thereof. Embodiments are not limited thereto.

In some example embodiments, the prism 1105 may move in a positive (+) direction or a negative (−) direction of the direction B by around 20 degrees, or between 10 degrees and 20 degrees, or between 15 degrees and 20 degrees. In some example embodiments, a moving angle may be an angle that may move at the same angle in the positive (+) or negative (−) direction of the direction B, or may move to almost the same angle in a range of around 1 degree.

In some example embodiments, the prism 1105 may move the reflective surface 1107 of the light reflecting material in a third direction (e.g., the direction Z), parallel to an extending direction of the central axis 1106.

The OPFE 1110 may include, for example, optical lenses of m (where m is a natural number) groups. The m optical lenses may move in the second direction Y to change an optical zoom ratio of the camera module 1100b. For example, if a basic optical zoom magnification of the camera module 1100b is Z, when the m optical lenses included in the OPFE 1110 move, an optical zoom magnification of the camera module 1100b may be changed to have an optical zoom magnification of 3Z, 5Z, or 5Z or higher.

The actuator 1130 may move the OPFE 1110 or an optical lens (hereinafter, referred to as an optical lens) to a specific position. For example, the actuator 1130 may adjust a position of the optical lens to locate an image sensor 1142 at a focal length of the optical lens for accurate sensation.

The image sensing device 1140 may include an image sensor 1142, a control logic 1144, and/or a memory 1146. The image sensor 1142 may sense an image of an object to be sensed by using light L provided through an optical lens. The control logic 1144 may control an overall operation of the camera module 1100b. For example, the control logic 1144 may control an operation of the camera module 1100b according to a control signal provided through a control signal line CSLb.

The memory 1146 may store information necessary for an operation of the camera module 1100b, such as calibration data 1147. The calibration data 1147 may include information necessary for the camera module 1100b to generate image data using light L externally provided. The calibration data 1147 may include, for example, information on the degree of rotation, described above, information on a focal length, information on an optical axis, or the like. When the camera module 1100b is implemented in the form of a multi-state camera of which focal length is changed according to a position of the optical lens, the calibration data 1147 may include a focal length value for each position (or state) of the optical lens, and information related to auto focusing.

The storage device 1150 may store the image data sensed by the image sensor 1142. The storage device 1150 may be disposed external to the image sensing device 1140, and may be implemented in stacked form with a sensor chip constituting the image sensing device 1140. In some example embodiments, the storage device 1150 may be implemented as an electrically erasable programmable read-only memory (EEPROM), but example embodiments are not limited thereto.

Referring to FIGS. 22 and 23 together, in some example embodiments, the plurality of camera modules 1100a, 1100b, and 1100c may include the actuator 1130, respectively. Therefore, the plurality of camera modules 1100a, 1100b, and 1100c may include the same or different calibration data 1147, respectively, according to an operation of the actuator 1130 included therein.

In example embodiments, a camera module (e.g., 1100b), among the plurality of camera modules 1100a, 1100b, and 1100c, may be a folded lens type camera module including the prism 1105 and the OPFE 1110, described above, and remaining camera module(s) (e.g., 1100a or 1100b) may be a vertical type camera module not including the prism 1105 and the OPFE 1110, but example embodiments are not limited thereto.

In some example embodiments, a camera module (e.g., 1100c), among the plurality of camera modules 1100a, 1100b, and 1100c, may be a vertical type depth camera for extracting depth information using, for example, infrared ray (IR). In some example embodiments, the application processor 1200 may merge image data provided from the depth camera with image data provided from another camera module (for example, 1100a or 1100b) to generate a 3D depth image.

In some example embodiments, at least two camera modules (e.g., 1100a and 1100b), among the plurality of camera modules 1100a, 1100b, and 1100c, may have different fields of view (e.g., field of view angles). In some example embodiments, for example, optical lenses of the at least two camera modules (e.g., 1100a and 1100b), among the plurality of camera modules 1100a, 1100b, and 1100c, may be different from each other, but are not limited thereto.

In addition, in some example embodiments, field of view angles of each of the plurality of camera modules 1100a, 1100b, and 1100c may be different. In some example embodiments, optical lenses included in each of the plurality of camera modules 1100a, 1100b, and 1100c may also be different from each other, but are not limited thereto.

In some example embodiments, each of the plurality of camera modules 1100a, 1100b, and 1100c may be arranged to be physically separated from each other. For example, a sensation area of the one image sensor 1142 may not be divided and used by the plurality of camera modules 1100a, 1100b, and 1100c, but an independent image sensor 1142 inside each of the plurality of camera modules 1100a, 1100b, and 1100c may be disposed.

Referring back to FIG. 22, the application processor 1200 may include an image processing device 1210, a memory controller 1220, and/or an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented to be separated from each other, as separate semiconductor chips.

The image processing device 1210 may include a plurality of sub-image signal processors 1212a, 1212b, and 1212c, an image generator 1214, and/or a camera module controller 1216.

The image processing device 1210 may include a plurality of sub-image signal processors 1212a, 1212b and 1212c, corresponding to the number of camera modules 1100a, 1100b, and 1100c.

Image data generated from each of the camera modules 1100a, 1100b, and 1100c may be provided to the corresponding sub-image signal processors 1212a, 1212b, and 1212c through image signal lines ISLa, ISLb, and ISLc, separated from each other. For example, image data generated from the camera module 1100a may be provided to the sub-image signal processor 1212a through the image signal line ISLa, image data generated from the camera module 1100b may be provided to the sub-image signal processor 1212b through the image signal line ISLb, and image data generated from the camera module 1100c may be provided to the sub-image signal processor 1212c through the image signal line ISLc. Transmission of such image data may be performed using, for example, a camera serial interface (CSI) based on a mobile industry processor interface (MIPI), but example embodiments are not limited thereto.

In some example embodiments, a sub-image signal processor may be disposed to correspond to a plurality of camera modules. For example, the sub-image signal processor 1212a and the sub-image signal processor 1212c may not be implemented to be separated from each other, as illustrated, but may be implemented to be integrated into a single sub-image signal processor, and image data provided from the camera module 1100a and the camera module 1100c may be selected by a select element (e.g., a multiplexer) or the like, and may be then provided to the integrated sub-image signal processor.

Image data provided to each of the sub-image signal processors 1212a, 1212b, and 1212c may be provided to the image generator 1214. The image generator 1214 may use the image data provided from each of the sub-image signal processors 1212a, 1212b, and 1212c, according to image generation information or a mode signal, to generate an output image.

For example, the image generator 1214 may merge at least portion of the image data generated from the camera modules 1100a, 1100b, and 1100c having different field of view angles, according to image generation information or a mode signal, to generate an output image. In addition, the image generator 1214 may generate an output image by selecting one of image data generated from camera modules 1100a, 1100b, and 1100c having different viewing angles according to image generation information or a mode signal.

In some example embodiments, the image generation information may include a zoom signal or a zoom factor. Further, in some example embodiments, the mode signal may be, for example, a signal based on a mode selected by a user.

When the image generation information is a zoom signal (e.g., a zoom factor) and each of the camera modules 1100a, 1100b, and 1100c has a different field of view field (e.g., a different field of view angle), the image generator 1214 may operate differently according to a type of the zoom signal. For example, when the zoom signal is a first signal, after merging image data output from the camera module 1100a and image data output from the camera module 1100c, the merged image signal and image data output from the camera module 1100b, not used in the merging, may be used to generate an output image. When the zoom signal is a second signal, different from the first signal, the image generator 1214 may not perform such image data merging, and may select one of the image data output from each of the camera module 1100a, 1100b, and 1100c, to create an output image. Example embodiments are not limited thereto, and a method of processing image data may be modified and performed as needed.

In some example embodiments, the image generator 1214 may receive a plurality of pieces of image data having different exposure points in time from at least one sub-image signal processor, among the plurality of sub-image signal processors 1212a, 1212b, and 1212c, and may process high dynamic range (HDR) with respect to the plurality of pieces of image data, to generate merged image data having an increased dynamic range.

The camera module controller 1216 may provide a control signal to each of the camera modules 1100a, 1100b, and 1100c. The control signal generated from the camera module controller 1216 may be provided to the corresponding camera modules 1100a, 1100b, and 1100c through control signal lines CSLa, CSLb, and CSLc, separated from each other.

One of the plurality of camera modules 1100a, 1100b, and 1100c may be designated as a master camera (for example, 1100b), according to image generation information including a zoom signal, or a mode signal, and remaining camera modules (for example, 1100a and 1100c) may be designated as slave cameras. Such information may be included in the control signal, and may be provided to the corresponding camera modules 1100a, 1100b, and 1100c through the control signal lines CSLa, CSLb, and CSLc, separated from each other.

Camera modules operating as masters and slaves may be changed according to a zoom factor or an operation mode signal. For example, when a field of view angle of the camera module 1100a is wider than a field of view angle of the camera module 1100b and the zoom factor indicates a low zoom magnification, the camera module 1100b may operate as a master, and the camera module 1100a may operate as a slave. When the zoom factor indicates a high zoom magnification, the camera module 1100a may operate as a master and the camera module 1100b may operate as a slave.

In some example embodiments, a control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit a sync enable signal to the camera module 1100b. The camera module 1100b receiving such a sync enable signal may generate a sync signal based on the sync enable signal, and may transmit the generated sync signal to the camera modules 1100a and 1100c through a sync signal line SSL. The camera module 1100b and the camera modules 1100a and 1100c may be synchronized with the sync signal, to transmit image data to the application processor 1200.

In some example embodiments, a control signal provided from the camera module controller 1216 to the plurality of camera modules 1100a, 1100b, and 1100c may include mode information according to a mode signal. Based on this mode information, the plurality of camera modules 1100a, 1100b, and 1100c may operate in a first operation mode and a second operation mode in relation to a sensation rate.

In the first operation mode, the plurality of camera modules 1100a, 1100b, and 1100c may generate an image signal at a first rate (for example, generate an image signal of a first frame rate), may encode the generated image signal at a second rate, higher than the first rate (e.g., encode an image signal having a second frame rate, higher than the first frame rate), and may transmit the encoded image signal to the application processor 1200. In some example embodiments, the second rate may be 30 times or less of the first rate.

The application processor 1200 may store the transmitted image signal, e.g., the encoded image signal, in the internal memory 1230, or in a storage 1400 external to the application processor 1200, and may then read the encoded image signal from the internal memory 1230 or the storage 1400, may decode the read image signal, and may display image data generated based on the decoded image signal. For example, a corresponding sub-image signal processor, among the plurality of sub-image signal processors 1212a, 1212b, and 1212c of the image processing device 1210, may decode the read image signal, and may also perform image processing on the decoded image signal.

In the second operation mode, the plurality of camera modules 1100a, 1100b, and 1100c may generate an image signal at a third rate, lower than the first rate (e.g., generate an image signal of a third frame rate, lower than the first frame rate), and may transmit the image signal to the application processor 1200. The image signal provided to the application processor 1200 may be a signal, not encoded. The application processor 1200 may perform image processing on the received image signal, or may store the received image signal in the internal memory 1230 or the storage 1400.

The PMIC 1300 may supply power, for example, a power voltage to each of the plurality of camera modules 1100a, 1100b, and 1100c. For example, the PMIC 1300 may supply first power to the camera module 1100a through a power signal line PSLa under control of the application processor 1200, may supply second power to the camera module 1100b through a power signal line PSLb, and may supply third power to the camera module 1100c through a power signal line PSLc.

The PMIC 1300 may generate power, corresponding to each of the plurality of camera modules 1100a, 1100b, and 1100c, in response to a power control signal PCON from the application processor 1200, and may also adjust a level of the power. The power control signal PCON may include a power adjustment signal for each operation mode of the plurality of camera modules 1100a, 1100b, and 1100c. For example, the operation mode may include a low power mode. In some example embodiments, the power control signal PCON may include information on a camera module operating in the low power mode and a level of the power to be set. The levels of power provided to each of the plurality of camera modules 1100a, 1100b, and 1100c may be the same or different from each other. Also, the level of power may be dynamically changed.

Decision point distribution technique by a conventional auto zero voltage distribution may be difficult to use at higher gain. Since the conventional auto zero voltage distribution may be performed at a floating node of a first amplifier OTA1, a ramp signal should additionally cover an offset at higher gain. However an auto zero voltage distribution technique according to example embodiments of the present inventive concepts may be independent of gain, because a bias node of a second amplifier OTA2 is used. Since only delay of the second amplifier OTA2 may be changed, the auto zero voltage distribution technique may be used at higher gain.

An image sensor according to example embodiments of the present inventive concepts, an image device having the same, and an operating method thereof may distribute decision of double correlation sampling by dummy switch control split to reduce IR drop.

An image sensor according to example embodiments of the present inventive concepts, an image device having the same, and an operating method thereof may reduce IR drop of a front stage in an analog-digital circuit to improve a lower voltage characteristic of a digital logic of a rear stage.

While example embodiments have been illustrated and described above, it will be apparent to those skilled in the art that modifications and variations could be made without departing from the scope of the present inventive concepts as defined by the appended claims.

What is claimed is:

1. An image sensor comprising:
a first amplifier configured to compare a first voltage signal received from a first column line and a ramp signal and to amplify the first compared signal;
a second amplifier configured to amplify an output of the first amplifier;
a third amplifier configured to compare a second voltage signal received from a second column line and the ramp signal, and to amplify the second compared signal; and
a fourth amplifier configured to amplify an output of the third amplifier,
wherein the second amplifier and the fourth amplifier output a decision signal at different points in time by dummy switch control split,
wherein the dummy switch control split is based on dummy switch control signals that are different than an auto zero signal.

2. The image sensor of claim 1, wherein the first to fourth amplifiers include a differential amplifier, respectively.

3. The image sensor of claim 1, wherein each of the first amplifier and the third amplifier comprises:
a first output transistor connected to a power supply terminal and a comparison node and having a gate connected to the comparison node;
a second output transistor connected to the power supply terminal and an output node and having a gate connected to the comparison node;
a first input transistor connected to the comparison node and a first bias node and having a gate connected to a second input node;
a second input transistor connected to the output node and the first bias node and having a gate connected to a first input node; and
a first current source connected between the first bias node and a ground terminal,
wherein the first input node receives a voltage signal from a corresponding column line, and
wherein the second input node receives the ramp signal.

4. The image sensor of claim 3, further comprising:
a first switch configured to connect the first input node and the output node in response to a first switch control signal in an auto zero section; and
a second switch configured to connect the second input node and the comparison node in response to the first switch control signal in the auto zero section.

5. The image sensor of claim 1, wherein each of the second amplifier and the fourth amplifier comprises:
an amplifying transistor connected between a first power supply terminal and an amplification node, and including a gate receiving a corresponding output among the first and third amplifiers;
a first bias transistor connected between the amplification node and a ground terminal;
a second bias transistor connected between the amplification node and a bias node and having a gate receiving a second switch control signal;
a third bias transistor having a drain and a source, connected to the bias node, and having a gate receiving a third switch control signal; and
a bias capacitor connected between the bias node and the ground terminal.

6. The image sensor of claim 5, wherein the third switch control signal for the dummy switch control split is generated differently, according to the first column line and the second column line.

7. The image sensor of claim 6, wherein a first switch control signal is transmitted from a timing controller through a first metal line,
the second switch control signal is transmitted from the timing controller through a second metal line,
the third switch control signal is transmitted from the timing controller through a third metal line,
at least two of the first metal line, the second metal line, and the third metal line are arranged in different layers.

* * * * *